US009343808B2

(12) United States Patent
Harel et al.

(10) Patent No.: US 9,343,808 B2
(45) Date of Patent: *May 17, 2016

(54) MULTI-BEAM MIMO TIME DIVISION DUPLEX BASE STATION USING SUBSET OF RADIOS

(71) Applicant: Magnolia Broadband Inc., Englewood, NJ (US)

(72) Inventors: Haim Harel, New York, NY (US); Eduardo Abreu, Allentown, PA (US); Kenneth Kludt, San Jose, CA (US); Phil F. Chen, Denville, NJ (US); Sherwin J. Wang, Towaco, NJ (US)

(73) Assignee: MAGNOTOD LLC, San Francisco, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/888,057

(22) Filed: May 6, 2013

(65) Prior Publication Data

US 2014/0225776 A1 Aug. 14, 2014

Related U.S. Application Data

(60) Provisional application No. 61/762,486, filed on Feb. 8, 2013, provisional application No. 61/811,751, filed on Apr. 14, 2013.

(51) Int. Cl.
*H01Q 3/00* (2006.01)
*G01S 13/02* (2006.01)
(Continued)

(52) U.S. Cl.
CPC ................ *H01Q 3/26* (2013.01); *H01Q 1/246* (2013.01); *H01Q 3/00* (2013.01); *H01Q 3/34* (2013.01); *H01Q 3/40* (2013.01); *H01Q 21/061* (2013.01); *H01Q 21/24* (2013.01)

(58) Field of Classification Search
USPC ......... 342/81, 154, 372, 373, 374; 455/277.1, 455/280; 375/260
See application file for complete search history.

(56) References Cited

U.S. PATENT DOCUMENTS 4,044,359 A 8/1977 Applebaum et al.
4,079,318 A 3/1978 Kinoshita
(Continued)

FOREIGN PATENT DOCUMENTS

EP 1 189 303 3/2002
EP 1 867 177 5/2010
(Continued)

OTHER PUBLICATIONS

Office Action issued by the United States Patent and Trademark Office for U.S. Appl. No. 13/762,188 dated May 15, 2013.
(Continued)

*Primary Examiner* — Dao Phan
(74) *Attorney, Agent, or Firm* — Pearl Cohen Zedek Latzer Baratz LLP

(57) ABSTRACT

A system and method may include a plurality of transmit and receive antennas covering one sector of a cellular communication base station; a multi-beam RF beamforming matrix connected to the transmit and receive antennas; a plurality of radio circuitries connected to the multi-beam RF beamforming matrix; and a baseband module connected to the radio circuitries. The multi-beam RF beamforming matrix may be configured to generate one sector beam and two or more directional co-frequency beams pointed at user equipment (UEs) within the sector, as instructed by the baseband module. A number M denotes the number the directional beams and a number N denotes the number of the radio circuitries and wherein M>N.

30 Claims, 17 Drawing Sheets

(51) Int. Cl.

| | |
|---|---|
| ***H01Q 3/26*** | (2006.01) |
| ***H01Q 3/34*** | (2006.01) |
| ***H01Q 1/24*** | (2006.01) |
| ***H01Q 3/40*** | (2006.01) |
| ***H01Q 21/06*** | (2006.01) |
| ***H01Q 21/24*** | (2006.01) |

(56) References Cited

U.S. PATENT DOCUMENTS 4,359,738 A 11/1982 Lewis
4,540,985 A 9/1985 Clancy et al.
4,628,320 A 12/1986 Downie
5,162,805 A 11/1992 Cantrell
5,363,104 A 11/1994 Richmond
5,444,762 A 8/1995 Frey et al.
5,732,075 A 3/1998 Tangemann et al.
5,915,215 A 6/1999 Williams et al.
5,936,577 A 8/1999 Shoki et al.
5,940,033 A 8/1999 Locher et al.
6,018,317 A 1/2000 Dogan et al.
6,026,081 A 2/2000 Hamabe
6,046,655 A 4/2000 Cipolla
6,094,165 A 7/2000 Smith
6,101,399 A 8/2000 Raleigh et al.
6,163,695 A 12/2000 Takemura
6,167,286 A 12/2000 Ward et al.
6,215,812 B1 4/2001 Young et al.
6,226,507 B1 5/2001 Ramesh et al.
6,230,123 B1 5/2001 Mekuria et al.
6,259,683 B1 7/2001 Sekine et al.
6,297,772 B1 10/2001 Lewis
6,321,077 B1 11/2001 Saitoh et al.
6,335,953 B1 1/2002 Sanderford et al.
6,370,378 B1 4/2002 Yahagi
6,377,783 B1 4/2002 Lo et al.
6,393,282 B1 5/2002 Iimori
6,584,115 B1 6/2003 Suzuki
6,647,276 B1 11/2003 Kuwahara et al.
6,697,622 B1 2/2004 Ishikawa et al.
6,697,633 B1 2/2004 Dogan et al.
6,735,182 B1 5/2004 Nishimori et al.
6,834,073 B1 12/2004 Miller et al.
6,842,460 B1 1/2005 Olkkonen et al.
6,914,890 B1 7/2005 Tobita et al.
6,927,646 B2 8/2005 Niemi
6,934,541 B2 8/2005 Miyatani
6,975,582 B1 12/2005 Karabinis et al.
6,987,958 B1 1/2006 Lo et al.
7,068,628 B2 6/2006 Li et al.
7,154,960 B2 12/2006 Liu et al.
7,177,663 B2 2/2007 Axness et al.
7,190,964 B2 3/2007 Damnjanovic et al.
7,257,425 B2 8/2007 Wang et al.
7,299,072 B2 11/2007 Ninomiya
7,391,757 B2 6/2008 Haddad et al.
7,392,015 B1 6/2008 Farlow et al.
7,474,676 B2 1/2009 Tao et al.
7,499,109 B2 3/2009 Kim et al.
7,512,083 B2 3/2009 Li
7,606,528 B2 10/2009 Mesecher
7,634,015 B2 12/2009 Waxman
7,646,744 B2 1/2010 Li
7,719,993 B2 5/2010 Li et al.
7,742,000 B2 6/2010 Mohamadi
7,769,107 B2 8/2010 Sandhu et al.
7,876,848 B2 1/2011 Han et al.
7,881,401 B2 2/2011 Kraut et al.
7,898,478 B2 3/2011 Niu et al.
7,904,086 B2 3/2011 Kundu et al.
7,904,106 B2 3/2011 Han et al.
7,933,255 B2 4/2011 Li
7,970,366 B2 6/2011 Arita et al.
8,078,109 B1 12/2011 Mulcay
8,103,284 B2 1/2012 Mueckenheim et al.
8,111,782 B2 2/2012 Kim et al.
8,115,679 B2 2/2012 Falk
8,155,613 B2 4/2012 Kent et al.
8,194,602 B2 6/2012 van Rensburg et al.
8,275,377 B2 9/2012 Nanda et al.
8,280,443 B2 10/2012 Tao et al.
8,294,625 B2 10/2012 Kittinger et al.
8,306,012 B2 11/2012 Lindoff et al.
8,315,671 B2 11/2012 Kuwahara et al.
8,369,436 B2 2/2013 Stirling-Gallacher
8,504,098 B2 8/2013 Khojastepour
8,509,190 B2 8/2013 Rofougaran
8,520,657 B2 8/2013 Rofougaran
8,526,886 B2 9/2013 Wu et al.
8,571,127 B2 10/2013 Jiang et al.
8,588,844 B2 11/2013 Shpak
8,599,955 B1 12/2013 Kludt et al.
8,599,979 B2 12/2013 Farag et al.
8,605,658 B2 12/2013 Fujimoto
8,611,288 B1 12/2013 Zhang et al.
8,644,413 B2 2/2014 Harel et al.
8,649,458 B2 2/2014 Kludt et al.
8,666,319 B2 3/2014 Kloper et al.
8,670,504 B2 3/2014 Naguib
8,744,511 B2 6/2014 Jones et al.
8,754,810 B2 6/2014 Guo et al.
8,767,862 B2 7/2014 Abreu et al.
8,780,743 B2 7/2014 Sombrutzki et al.
8,797,969 B1 8/2014 Harel et al.
8,891,598 B1 11/2014 Wang et al.
8,928,528 B2 * 1/2015 Harel et al. .................. 342/373
8,942,134 B1 1/2015 Kludt et al.
8,976,845 B2 3/2015 O'Keeffe et al.
9,014,066 B1 4/2015 Wang et al.
9,035,828 B2 5/2015 O'Keeffe et al.
2001/0029326 A1 10/2001 Diab et al.
2001/0038665 A1 11/2001 Baltersee et al.
2002/0024975 A1 2/2002 Hendler
2002/0051430 A1 5/2002 Kasami et al.
2002/0065107 A1 5/2002 Harel et al.
2002/0085643 A1 7/2002 Kitchener et al.
2002/0107013 A1 8/2002 Fitzgerald
2002/0115474 A1 8/2002 Yoshino et al.
2002/0181426 A1 12/2002 Sherman
2002/0181437 A1 12/2002 Ohkubo et al.
2003/0087645 A1 5/2003 Kim et al.
2003/0114162 A1 6/2003 Chheda et al.
2003/0153322 A1 8/2003 Burke et al.
2003/0153360 A1 8/2003 Burke et al.
2003/0186653 A1 10/2003 Mohebbi et al.
2003/0203717 A1 10/2003 Chuprun et al.
2003/0203743 A1 10/2003 Sugar et al.
2004/0023693 A1 2/2004 Okawa et al.
2004/0056795 A1 3/2004 Ericson et al.
2004/0063455 A1 4/2004 Eran et al.
2004/0081144 A1 4/2004 Martin et al.
2004/0121810 A1 6/2004 Goransson et al.
2004/0125899 A1 7/2004 Li et al.
2004/0125900 A1 7/2004 Liu et al.
2004/0142696 A1 7/2004 Saunders et al.
2004/0147266 A1 7/2004 Hwang et al.
2004/0156399 A1 8/2004 Eran
2004/0166902 A1 8/2004 Castellano et al.
2004/0198292 A1 10/2004 Smith et al.
2004/0228388 A1 11/2004 Salmenkaita
2004/0235527 A1 11/2004 Reudink et al.
2004/0264504 A1 12/2004 Jin
2005/0068230 A1 3/2005 Munoz et al.
2005/0068918 A1 3/2005 Mantravadi et al.
2005/0075140 A1 4/2005 Famolari
2005/0085266 A1 4/2005 Narita
2005/0129155 A1 6/2005 Hoshino
2005/0147023 A1 7/2005 Stephens et al.
2005/0163097 A1 7/2005 Do et al.
2005/0245224 A1 11/2005 Kurioka
2005/0250544 A1 11/2005 Grant et al.
2005/0254513 A1 11/2005 Cave et al.
2005/0265436 A1 12/2005 Suh et al.
2005/0286440 A1 12/2005 Strutt et al.

(56) References Cited

U.S. PATENT DOCUMENTS

| | | | |
|---|---|---|---|
| 2005/0287962 | A1 | 12/2005 | Mehta et al. |
| 2006/0041676 | A1 | 2/2006 | Sherman |
| 2006/0092889 | A1 | 5/2006 | Lyons et al. |
| 2006/0094372 | A1 | 5/2006 | Ahn et al. |
| 2006/0098605 | A1 | 5/2006 | Li |
| 2006/0111149 | A1 | 5/2006 | Chitrapu et al. |
| 2006/0135097 | A1 | 6/2006 | Wang et al. |
| 2006/0183503 | A1 | 8/2006 | Goldberg |
| 2006/0203850 | A1 | 9/2006 | Johnson et al. |
| 2006/0227854 | A1 | 10/2006 | McCloud et al. |
| 2006/0264184 | A1 | 11/2006 | Li et al. |
| 2006/0270343 | A1 | 11/2006 | Cha et al. |
| 2006/0271969 | A1 | 11/2006 | Takizawa et al. |
| 2006/0285507 | A1 | 12/2006 | Kinder et al. |
| 2007/0041398 | A1 | 2/2007 | Benveniste |
| 2007/0058581 | A1 | 3/2007 | Benveniste |
| 2007/0076675 | A1 | 4/2007 | Chen |
| 2007/0093261 | A1 | 4/2007 | Hou et al. |
| 2007/0097918 | A1 | 5/2007 | Cai et al. |
| 2007/0115882 | A1 | 5/2007 | Wentink |
| 2007/0115914 | A1 | 5/2007 | Ohkubo et al. |
| 2007/0152903 | A1 | 7/2007 | Lin et al. |
| 2007/0217352 | A1 | 9/2007 | Kwon |
| 2007/0223380 | A1 | 9/2007 | Gilbert et al. |
| 2007/0249386 | A1 | 10/2007 | Bennett |
| 2007/0298742 | A1 | 12/2007 | Ketchum et al. |
| 2008/0043867 | A1 | 2/2008 | Blanz et al. |
| 2008/0051037 | A1 | 2/2008 | Molnar et al. |
| 2008/0081671 | A1 | 4/2008 | Wang et al. |
| 2008/0095163 | A1 | 4/2008 | Chen et al. |
| 2008/0108352 | A1 | 5/2008 | Montemurro et al. |
| 2008/0125120 | A1 | 5/2008 | Gallagher et al. |
| 2008/0144737 | A1 | 6/2008 | Naguib |
| 2008/0165732 | A1 | 7/2008 | Kim et al. |
| 2008/0238808 | A1 | 10/2008 | Arita et al. |
| 2008/0240314 | A1 | 10/2008 | Gaal et al. |
| 2008/0247370 | A1 | 10/2008 | Gu et al. |
| 2008/0267142 | A1 | 10/2008 | Mushkin et al. |
| 2008/0280571 | A1 | 11/2008 | Rofougaran et al. |
| 2008/0285637 | A1 | 11/2008 | Liu et al. |
| 2009/0003299 | A1 | 1/2009 | Cave et al. |
| 2009/0028225 | A1 | 1/2009 | Runyon et al. |
| 2009/0046638 | A1 | 2/2009 | Rappaport et al. |
| 2009/0058724 | A1 | 3/2009 | Xia et al. |
| 2009/0121935 | A1 | 5/2009 | Xia et al. |
| 2009/0137206 | A1 | 5/2009 | Sherman et al. |
| 2009/0154419 | A1 | 6/2009 | Yoshida et al. |
| 2009/0187661 | A1 | 7/2009 | Sherman |
| 2009/0190541 | A1 | 7/2009 | Abedi |
| 2009/0227255 | A1 | 9/2009 | Thakare |
| 2009/0239486 | A1 | 9/2009 | Sugar et al. |
| 2009/0268616 | A1 | 10/2009 | Hosomi |
| 2009/0279478 | A1 | 11/2009 | Nagaraj et al. |
| 2009/0285331 | A1 | 11/2009 | Sugar et al. |
| 2009/0322610 | A1 | 12/2009 | Hants et al. |
| 2009/0322613 | A1 | 12/2009 | Bala et al. |
| 2009/0323608 | A1 | 12/2009 | Adachi et al. |
| 2010/0002656 | A1 | 1/2010 | Ji et al. |
| 2010/0037111 | A1 | 2/2010 | Ziaja et al. |
| 2010/0040369 | A1 | 2/2010 | Zhao et al. |
| 2010/0067473 | A1 | 3/2010 | Cave et al. |
| 2010/0087227 | A1 | 4/2010 | Francos et al. |
| 2010/0111039 | A1 | 5/2010 | Kim et al. |
| 2010/0117890 | A1 | 5/2010 | Vook et al. |
| 2010/0135420 | A1 | 6/2010 | Xu et al. |
| 2010/0150013 | A1 | 6/2010 | Hara et al. |
| 2010/0172429 | A1 | 7/2010 | Nagahama et al. |
| 2010/0195560 | A1 | 8/2010 | Nozaki et al. |
| 2010/0195601 | A1 | 8/2010 | Zhang |
| 2010/0208712 | A1 | 8/2010 | Wax et al. |
| 2010/0222011 | A1 | 9/2010 | Behzad |
| 2010/0232355 | A1 | 9/2010 | Richeson et al. |
| 2010/0234071 | A1 | 9/2010 | Shabtay et al. |
| 2010/0278063 | A1 | 11/2010 | Kim et al. |
| 2010/0283692 | A1 | 11/2010 | Achour et al. |
| 2010/0285752 | A1 | 11/2010 | Lakshmanan et al. |
| 2010/0291931 | A1 | 11/2010 | Suemitsu et al. |
| 2010/0303170 | A1 | 12/2010 | Zhu et al. |
| 2010/0316043 | A1 | 12/2010 | Doi et al. |
| 2011/0019639 | A1 | 1/2011 | Karaoguz et al. |
| 2011/0032849 | A1 | 2/2011 | Yeung et al. |
| 2011/0032972 | A1 | 2/2011 | Wang et al. |
| 2011/0085465 | A1 | 4/2011 | Lindoff et al. |
| 2011/0085532 | A1 | 4/2011 | Scherzer et al. |
| 2011/0105036 | A1 | 5/2011 | Rao et al. |
| 2011/0116489 | A1 | 5/2011 | Grandhi |
| 2011/0134816 | A1 | 6/2011 | Liu et al. |
| 2011/0150050 | A1 | 6/2011 | Trigui et al. |
| 2011/0150066 | A1 | 6/2011 | Fujimoto |
| 2011/0151826 | A1 | 6/2011 | Miller et al. |
| 2011/0163913 | A1 | 7/2011 | Cohen et al. |
| 2011/0205883 | A1 | 8/2011 | Mihota |
| 2011/0205998 | A1 | 8/2011 | Hart et al. |
| 2011/0228742 | A1 | 9/2011 | Honkasalo et al. |
| 2011/0249576 | A1 | 10/2011 | Chrisikos et al. |
| 2011/0250884 | A1 | 10/2011 | Brunel et al. |
| 2011/0273977 | A1 | 11/2011 | Shapira et al. |
| 2011/0281541 | A1 | 11/2011 | Borremans |
| 2011/0299437 | A1 | 12/2011 | Mikhemar et al. |
| 2011/0310827 | A1 | 12/2011 | Srinivasa et al. |
| 2011/0310853 | A1 | 12/2011 | Yin et al. |
| 2012/0014377 | A1 | 1/2012 | Joergensen et al. |
| 2012/0015603 | A1 | 1/2012 | Proctor et al. |
| 2012/0020396 | A1 | 1/2012 | Hohne et al. |
| 2012/0027000 | A1 | 2/2012 | Wentink |
| 2012/0028638 | A1 | 2/2012 | Mueck et al. |
| 2012/0028655 | A1 | 2/2012 | Mueck et al. |
| 2012/0028671 | A1 | 2/2012 | Niu et al. |
| 2012/0033761 | A1 | 2/2012 | Guo et al. |
| 2012/0034952 | A1 | 2/2012 | Lo et al. |
| 2012/0045003 | A1 | 2/2012 | Li et al. |
| 2012/0051287 | A1 | 3/2012 | Merlin et al. |
| 2012/0064838 | A1 | 3/2012 | Miao et al. |
| 2012/0069828 | A1 | 3/2012 | Taki et al. |
| 2012/0076028 | A1 | 3/2012 | Ko et al. |
| 2012/0076229 | A1 | 3/2012 | Brobston et al. |
| 2012/0088512 | A1 | 4/2012 | Yamada et al. |
| 2012/0092217 | A1 | 4/2012 | Hosoya et al. |
| 2012/0100802 | A1 | 4/2012 | Mohebbi |
| 2012/0115523 | A1 | 5/2012 | Shpak |
| 2012/0155349 | A1 | 6/2012 | Bajic et al. |
| 2012/0155397 | A1 | 6/2012 | Shaffer et al. |
| 2012/0163257 | A1 | 6/2012 | Kim et al. |
| 2012/0163302 | A1 | 6/2012 | Takano |
| 2012/0170453 | A1 | 7/2012 | Tiwari |
| 2012/0170672 | A1 | 7/2012 | Sondur |
| 2012/0201153 | A1 | 8/2012 | Bharadia et al. |
| 2012/0201173 | A1 | 8/2012 | Jain et al. |
| 2012/0207256 | A1 | 8/2012 | Farag et al. |
| 2012/0212372 | A1 | 8/2012 | Petersson et al. |
| 2012/0213065 | A1 | 8/2012 | Koo et al. |
| 2012/0218962 | A1 | 8/2012 | Kishiyama et al. |
| 2012/0220331 | A1 | 8/2012 | Luo et al. |
| 2012/0230380 | A1 | 9/2012 | Keusgen et al. |
| 2012/0251031 | A1 | 10/2012 | Suarez et al. |
| 2012/0270531 | A1 | 10/2012 | Wright et al. |
| 2012/0270544 | A1 | 10/2012 | Shah |
| 2012/0281598 | A1 | 11/2012 | Struhsaker et al. |
| 2012/0314570 | A1 | 12/2012 | Forenza et al. |
| 2012/0321015 | A1 | 12/2012 | Hansen et al. |
| 2012/0327870 | A1 | 12/2012 | Grandhi et al. |
| 2013/0010623 | A1 | 1/2013 | Golitschek |
| 2013/0012134 | A1 | 1/2013 | Jin et al. |
| 2013/0017794 | A1 | 1/2013 | Kloper et al. |
| 2013/0023225 | A1 | 1/2013 | Weber |
| 2013/0044877 | A1 | 2/2013 | Liu et al. |
| 2013/0051283 | A1 | 2/2013 | Lee et al. |
| 2013/0058239 | A1 | 3/2013 | Wang et al. |
| 2013/0070741 | A1 | 3/2013 | Li et al. |
| 2013/0079048 | A1 | 3/2013 | Cai et al. |
| 2013/0094437 | A1 | 4/2013 | Bhattacharya |
| 2013/0094621 | A1 | 4/2013 | Luo et al. |
| 2013/0095780 | A1 | 4/2013 | Prazan et al. |
| 2013/0101073 | A1 | 4/2013 | Zai et al. |

(56) References Cited

U.S. PATENT DOCUMENTS

| | | | |
|---|---|---|---|
| 2013/0150012 | A1 | 6/2013 | Chhabra et al. |
| 2013/0156016 | A1 | 6/2013 | Debnath et al. |
| 2013/0156120 | A1 | 6/2013 | Josiam et al. |
| 2013/0170388 | A1 | 7/2013 | Ito et al. |
| 2013/0172029 | A1 | 7/2013 | Chang et al. |
| 2013/0188541 | A1 | 7/2013 | Fischer |
| 2013/0190006 | A1 | 7/2013 | Kazmi et al. |
| 2013/0208587 | A1 | 8/2013 | Bala et al. |
| 2013/0208619 | A1 | 8/2013 | Kudo et al. |
| 2013/0223400 | A1 | 8/2013 | Seo et al. |
| 2013/0229996 | A1 | 9/2013 | Wang et al. |
| 2013/0229999 | A1 | 9/2013 | Da Silva et al. |
| 2013/0235720 | A1 | 9/2013 | Wang et al. |
| 2013/0242853 | A1 | 9/2013 | Seo et al. |
| 2013/0242899 | A1 | 9/2013 | Lysejko et al. |
| 2013/0242965 | A1 | 9/2013 | Horn et al. |
| 2013/0242976 | A1 | 9/2013 | Katayama et al. |
| 2013/0252621 | A1 | 9/2013 | Dimou et al. |
| 2013/0272437 | A1 | 10/2013 | Eidson et al. |
| 2013/0301551 | A1 | 11/2013 | Ghosh et al. |
| 2013/0304962 | A1 | 11/2013 | Yin et al. |
| 2013/0331136 | A1 | 12/2013 | Yang et al. |
| 2013/0343369 | A1 | 12/2013 | Yamaura |
| 2014/0010089 | A1 | 1/2014 | Cai et al. |
| 2014/0010211 | A1 | 1/2014 | Asterjadhi et al. |
| 2014/0029433 | A1 | 1/2014 | Wentink |
| 2014/0071873 | A1 | 3/2014 | Wang et al. |
| 2014/0079016 | A1 | 3/2014 | Dai et al. |
| 2014/0086077 | A1 | 3/2014 | Safavi |
| 2014/0086081 | A1 | 3/2014 | Mack et al. |
| 2014/0098681 | A1 | 4/2014 | Stager et al. |
| 2014/0119288 | A1 | 5/2014 | Zhu et al. |
| 2014/0185501 | A1 | 7/2014 | Park et al. |
| 2014/0185535 | A1 | 7/2014 | Park et al. |
| 2014/0192820 | A1 | 7/2014 | Azizi et al. |
| 2014/0204821 | A1 | 7/2014 | Seok et al. |
| 2014/0241182 | A1 | 8/2014 | Smadi |
| 2014/0242914 | A1 | 8/2014 | Monroe |
| 2014/0269409 | A1 | 9/2014 | Dimou et al. |
| 2014/0307653 | A1 | 10/2014 | Liu et al. |
| 2015/0016438 | A1 | 1/2015 | Harel et al. |
| 2015/0018042 | A1 | 1/2015 | Radulescu et al. |
| 2015/0085777 | A1 | 3/2015 | Seok |
| 2015/0124634 | A1 | 5/2015 | Harel et al. |
| 2015/0139212 | A1 | 5/2015 | Wang et al. |

FOREIGN PATENT DOCUMENTS

| | | |
|---|---|---|
| EP | 2 234 355 | 9/2010 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/630,146 dated Jan. 22, 2013.
Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.

(56) References Cited

OTHER PUBLICATIONS

Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference On, IEEE, Jun. 10, 2012, pp. 4095-4099.
Songtao Lu et al., "A Distributed Adaptive GSC Beamformer over Coordinated Antenna Arrays Network for Interference Mitigation", Asilomar Conference on Signals, Systems and Computers. Conference Record, IEEE Computer Society, US, Nov. 4, 2012, pp. 237-242.
International Search Report and Written Opinion for International Application No. PCT/US2014/065635 dated Feb. 13, 2015.
Notice of Allowance issued by the United States Patent and Trademark Office for U.S. Appl. No. 14/171,736 dated Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.
Notice of Allowance issued by the United States Patent and Trademark Office for U.S. Appl. No. 13/925,454 dated Apr. 14, 2015.
Office Action issued by the United States Patent and Trademark Office for U.S. Appl. No. 14/543,357 dated Apr. 23, 2015.
Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/181,844 dated May 13, 2015.
Notice of Allowance issued by the United States Patent and Trademark Office for U.S. Appl. No. 13/775,886 dated May 26, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.

(56) References Cited

OTHER PUBLICATIONS

Notice of Allowance issued by the United States Patent and Trademark Office for U.S. Appl. No. 14/505,655 dated Jun. 17, 2015.
Office Action issued by the United States Patent and Trademark Office for U.S. Appl. No. 14/472,759 dated Jun. 18, 2015.
Office Action issued by the United States Patent and Trademark Office for U.S. Appl. No. 14/042,020 dated Jun. 19, 2015.
Notice of Allowance issued by the United States Patent and Trademark Office for U.S. Appl. No. 14/480,920 dated Jun. 22, 2015.
International Search Report and Written Opinion for PCT International Application No. PCT/US2014/062116 dated Jun. 22, 2015.
Office Action issued by the United States Patent and Trademark Office for U.S. Appl. No. 14/467,415 dated Jun. 30, 2015.
International Search Report and Written Opinion for PCT International Application No. PCT/US2014/063304 dated Jul. 8, 2015.
Bandyopadhyay, S. et al., “An Adaptive MAC Protocol for Wireless Ad Hoc Community Network (WACNet) Using Electronically Steerable Passive Array Radiator Antenna”, Globecom ’01 : IEEE Global Telecommunications Conference; San Antonio, Texas, USA, Nov. 25-29, 2001, IEEE Operations Center, Piscataway, NJ, vol. 5, Nov. 25, 2001, pp. 2896-2900.
Du, Yongjiu et al., “iBeam: Intelligent Client-Side Multi-User Beamforming in Wireless Networks”, IEEE INFOCOM 2014—IEEE Conference on Computer Communications, IEEE, Apr. 27, 2014, pp. 817-825.
Office Action issued by the United States Patent and Trademark Office for U.S. Appl. No. 14/173,640 dated Jul. 16, 2015.
Office Action issued by the United States Patent and Trademark Office for U.S. Appl. No. 14/517,144 dated Jul. 28, 2015.
Office Action issued by the United States Patent and Trademark Office for U.S. Appl. No. 14/672,634 dated Aug. 12, 2015.
Notice of Allowance issued by the Unites States Patent and Trademark Office for U.S. Appl. No. 14/543,357 dated Sep. 2, 2015.
Office Action issued by the United States Patent and Trademark Office for U.S. Appl. No. 14/450,625 dated Sep. 10, 2015.
Office Action issued by the United States Patent and Trademark Office for U.S. Appl. No. 14/320,920 dated Sep. 21, 2015.
Office Action issued by the United States Patent and Trademark Office for U.S. Appl. No. 14/181,844 dated Sep. 25, 2015.

* cited by examiner

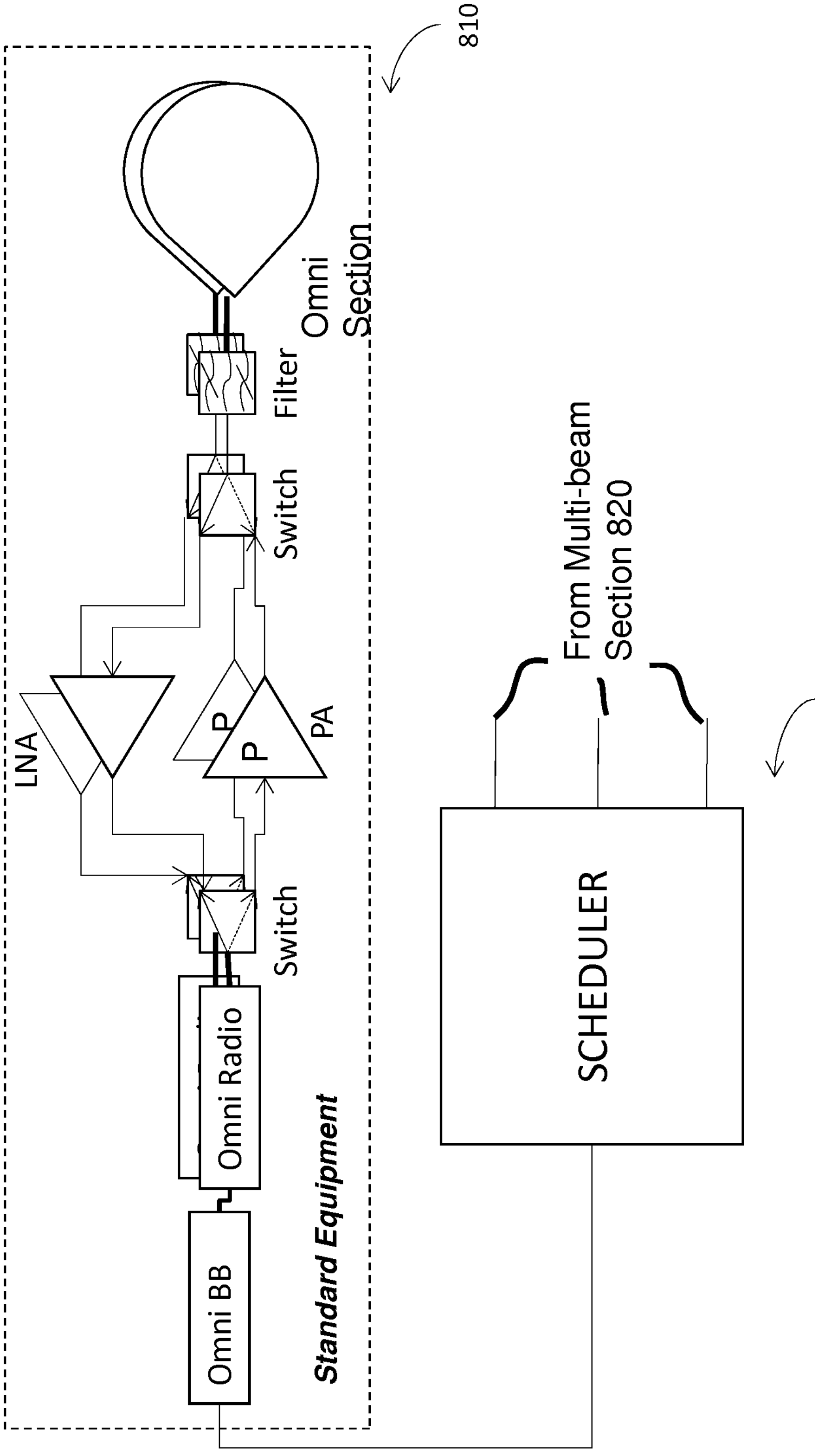
Figure 8 (cont. 1)

16 element SISO Array (K=1)

16 element 2x2 MIMO Array (K=2)

4 element 4x4 MIMO Array (K=4)

MULTI-BEAM MIMO TIME DIVISION DUPLEX BASE STATION USING SUBSET OF RADIOS

CROSS-REFERENCE TO RELATED APPLICATIONS

This application claims benefit of U.S. provisional patent application 61/762,486 filed on Feb. 8, 2013 and of U.S. provisional patent application 61/811,751 filed on Apr. 14, 2013 which are incorporated herein by reference in their entirety.

FIELD OF THE INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND OF THE INVENTION

In order to increase the number of users that can simultaneously use a cell's resources (e.g., spectrum), as well as reducing inter-cell interference by shrinking footprint of downlink signals, Active Antenna Array solutions (AAS) may be used to split cells into sectors; such cell splitting may be done in both Azimuth and Elevation domains, breaking up the cell into horizontal or vertical beams, or 2D (two dimensional) beams. Efficient reuse of spectrum in such sectors apparatus requires knowledge of "cross-talk" between different beams as seen by the UEs. It is also desirable to shape the beams in such a way that will minimize such cross-talk; internal cross-talk created by side-lobes and grating lobes should be controlled by antenna technology means, while external cross-talk sources coming from environmental reflections (multipath) should be handled by informed antennas weight setting.

As typical AAS solutions require multiplication of transceivers and baseband circuitries, sometimes driving costs up, architectures that may implement MU (multiple users) MIMO base station with less hardware may be advantageous in cases where cost sensitivity is significant.

BRIEF SUMMARY OF EMBODIMENTS OF THE INVENTION

Some embodiments of the present invention provide a system and method which may include a plurality of transmit and receive antennas covering one sector of a cellular communication base station; a multi-beam RF beamforming matrix connected to said transmit and receive antennas; a plurality of radio circuitries connected to said multi-beam RF beamforming matrix; and a baseband module connected to said radio circuitries. The multi-beam RF beamforming matrix is configured to generate one sector beam and two or more directional co-frequency beams pointed at user equipment (UEs) within said sector, as instructed by the baseband module. A number M denotes the number said directional beams and a number N denotes the number of said radio circuitries and wherein M>N.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

DETAILED DESCRIPTION

Figure 1:
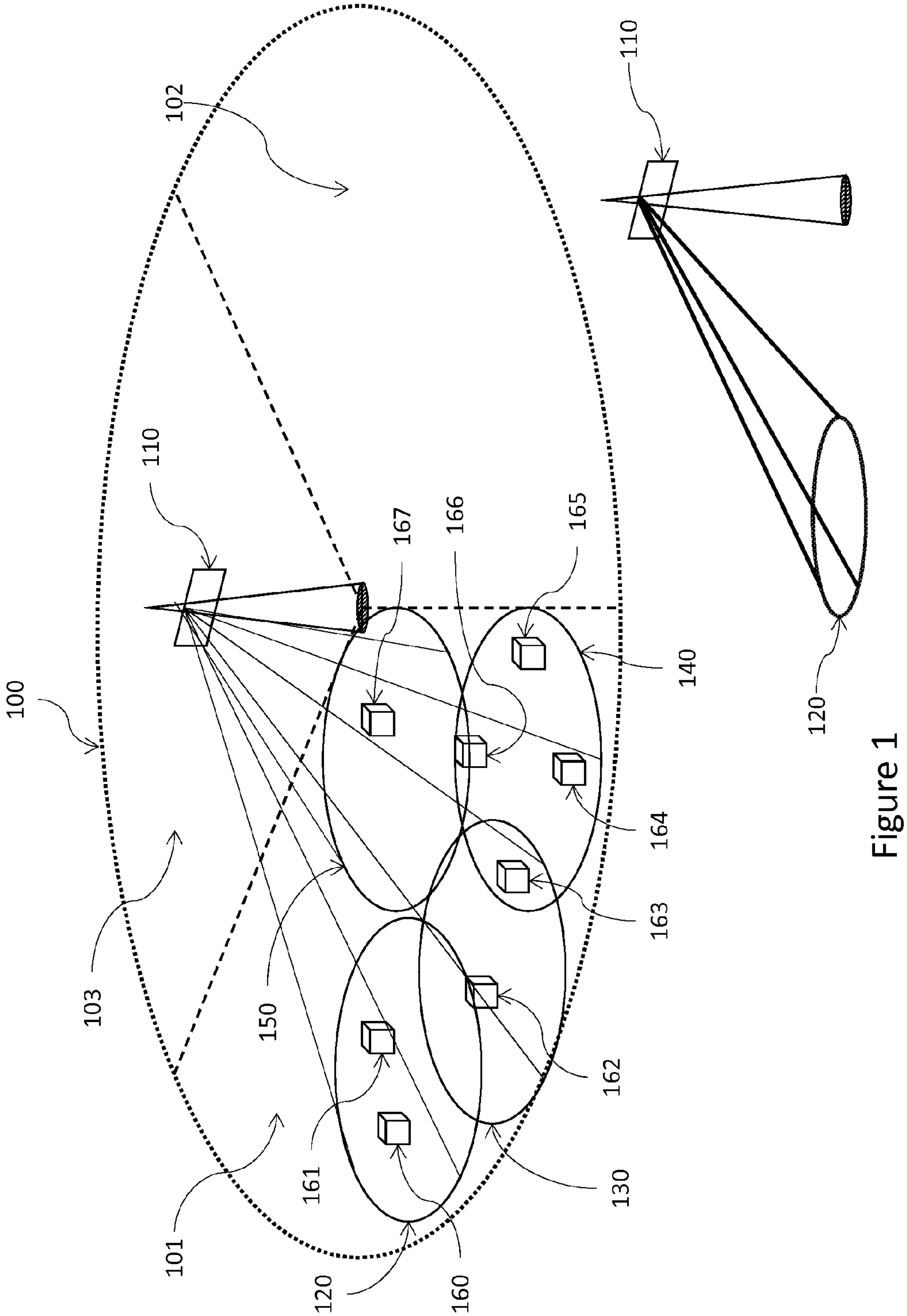
FIG. 1 is a diagram illustrating distribution of UEs in a sector and demonstrates cell/sector splitting in that sector according to some embodiments of the present invention.

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 is a diagram showing a cell 100 which is served by a basestation 110 which provides coverage in three sectors 101, 102 and 103. Sector 101 has been split, sectioned or divided into four subsectors 120, 130, 140 and 150 which are serving eight user equipment (UE) devices 160 to 167. The figure shows the UEs distributed or assigned to different sub sectors within sector 101. Assuming all UEs in a sector employ the same communications resources (e.g., the same protocols, channels, etc.), only one UE may normally communicate with the basestation 110 at one time (e.g., during one time period). When the sector is split into several subsectors as shown, it is assumed that some UEs may be active simultaneously and others not. It can be seen that UEs 160 and 161 may not operate simultaneously because they would create interference to each other. However, either may be operated with UE devices 164, 165, or 167 since they reside in non-adjacent or non-contiguous subsectors (e.g., subsectors that are not touching). For this case, it may be possible to operate UE devices 160 or 161 simultaneously with user UE device 162 depending on the interference each sees from the other.

Figure 2:
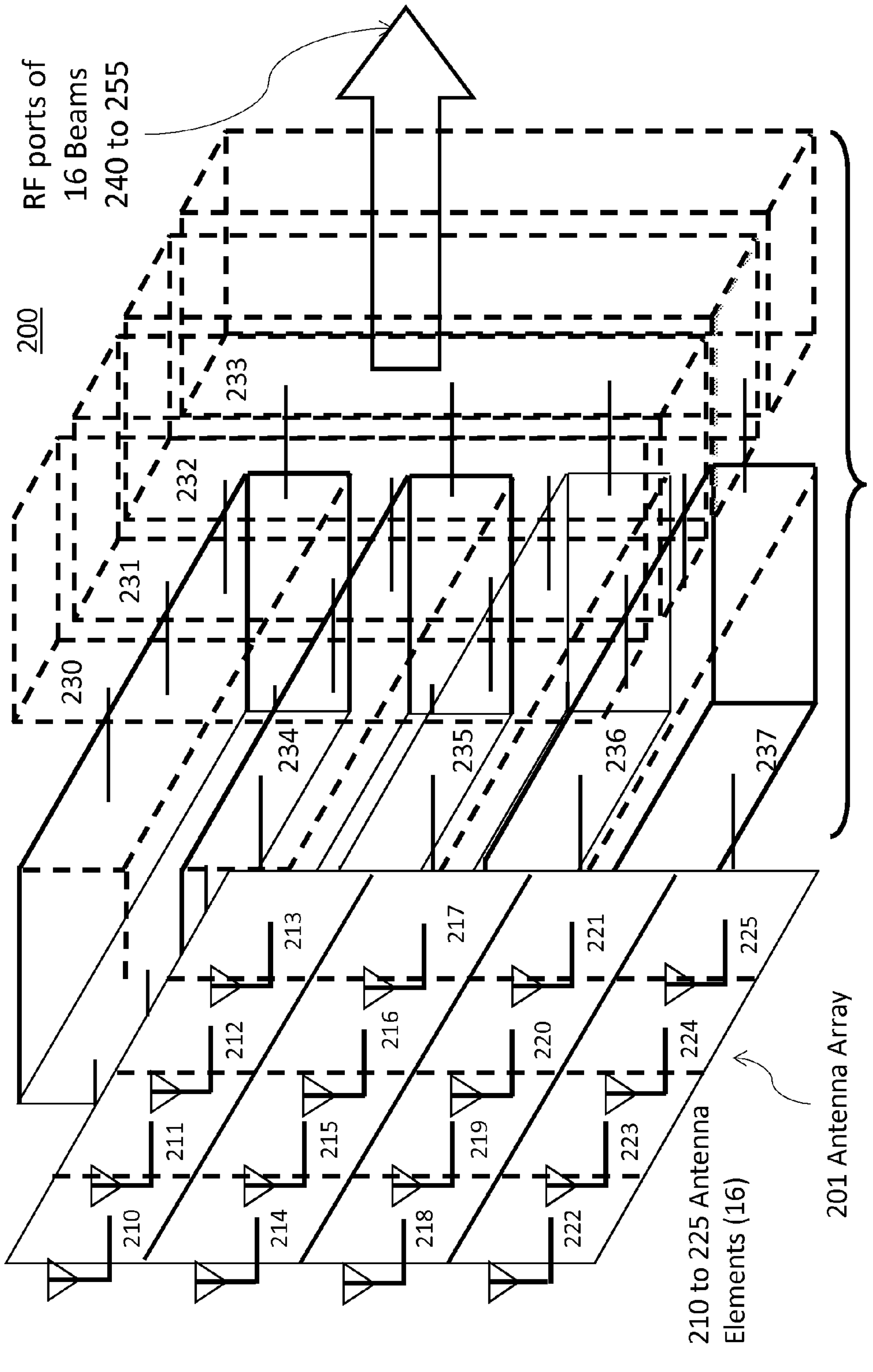
FIG. 2 shows an example implementation of a 2D RF beamformer according to some embodiments of the present invention.

FIG. 2 shows RF Beamformer 200. For this case an antenna array 201 including (in this example) 16 antennas 210 through 225 are combined in beamformer matrices 230 to 237 to output RF signals for 16 beams 240 to 255. Each beam is capable of illuminating (e.g., broadcasting to) one subsector when transmitting/receiving. In this configuration the antenna elements are arranged in four columns of four antennas. Other arrangements and other numbers of beams and antennas are possible. Each column of antennas is capable of creating up to four subsectors, each increasingly further from the basestation than the other. Similarly, each row of antennas is capable of creating up to four subsectors displaced in azimuth but extending from the basestation to the edge of cell. For the 16 antenna array shown, the beamformer may generate a four by four arrangement in coverage. In practice, not all beams would be required to implement complete sector coverage. Also, other antenna array sizes may be deployed and be within the purposes of this invention.

In one embodiment each of the beams (e.g., up to sixteen) may have a radio capable of measuring channel metrics for the communications to users (operating UE devices) in a subsector beam. When one user UE device is transmitting, the other radios may measure and record the amplitude of that signal in the other beams as contamination (interference). After all subsector beams have been characterized for all UE devices in a sector, a decision can be made to assign which UE devices to which subsector beams for operation and to determine which UE devices can be operated simultaneously with which others. Inasmuch as the beams and subsectors overlap in coverage to ensure communications are possible anywhere in the sector, support for one UE device may be provided by more than one beam (e.g., in FIG. 1, a user, e.g., operating UE 163 may be assigned to subsector 130 or 140). This assignment could be dynamic depending which other UE device is active at that time. For example, a user, e.g., operating UE 163 may be assigned to subsector 140 when operating with a user, e.g. operating UE device 162 but assigned to subsector 130 when operating simultaneously with UE devices 164, 165 or 166. It should be noted that if the system is TDD (time division duplex) (i.e., uses the same communications resources for the forward and reverse link), the basestation would normally transmit to a UE device on the same beam it used for receive. However, the scheduler might choose a different beam depending on which UE devices are transmitting versus receiving. The aforementioned beamformer requires a receiver for each subsector/beam. In general only the number of receivers necessary to support the number of simultaneous user UE devices is required.

Figure 3:
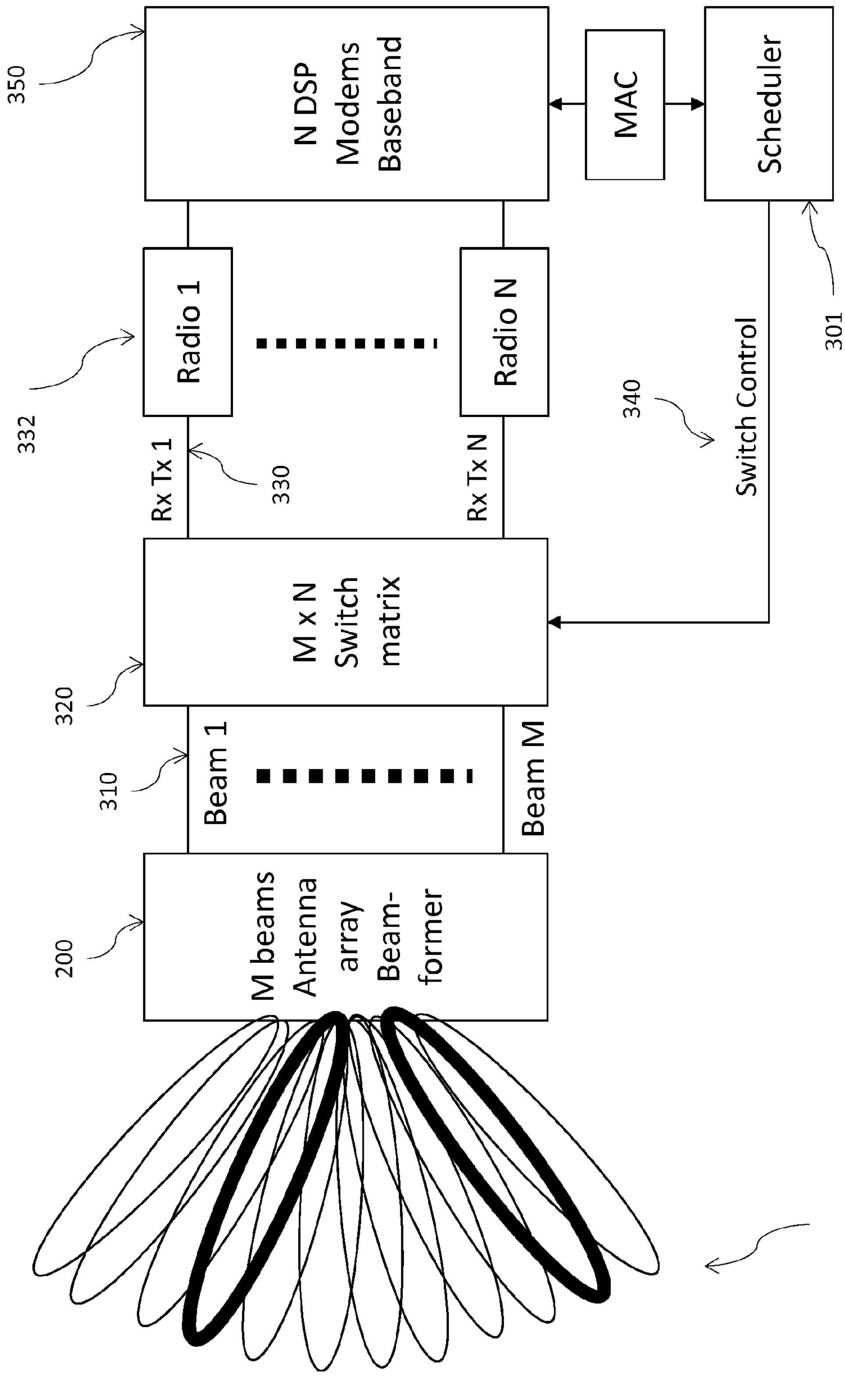
FIG. 3 shows an example implementation of an N out of M beam selection according to some embodiments of the present invention.

FIG. 3 shows an example of a system implementation of an N out of M beam selection where K=1.

Beamformer 200 of FIG. 2 feeds or provides its beam RF signals 310 to a matrix switch 320. During the user characterization process, the each of the N radios of the pool 330 records the cross-talk of the active user to all other beams.

The system may include a plurality of transmit and receive antennas covering one sector of a cellular communication base station; a multi-beam RF beamforming matrix connected to said transmit and receive antennas; a plurality of radio circuitries connected to said multi-beam RF beamforming matrix; and a baseband module connected to said radio circuitries 320, wherein the multi-beam RF beamforming matrix is configured to generate two or more directional co-frequency beams pointed at or directed at (e.g., sending signals in the direction of) user equipment (UEs) within a sector, as instructed by the baseband module, wherein a number M denotes the number of said directional beams and a number N denotes the number of said radio circuitries and wherein M>N. Each of the directional co-frequency beams may serve different and independent channels.

A scheduler 301 may implement switch control 340 over M×N switch matrix 320.

Figure 4:
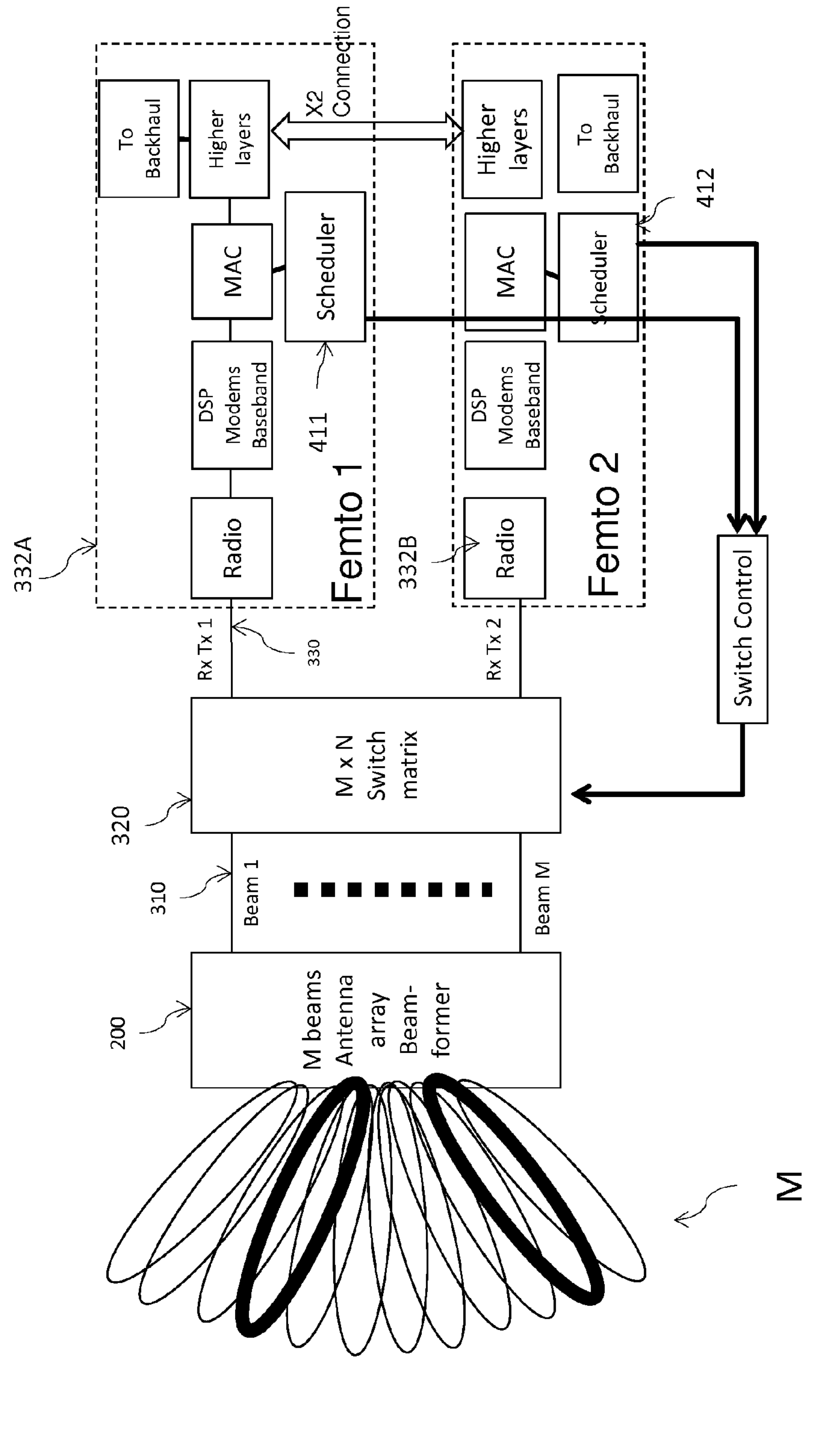
FIG. 4 shows a beamformer using independent Femto-cells according to some embodiments of the present invention.

FIG. 4 shows a beamformer using independent Femtocells, each having a radio circuitry 332A and 332B. In some embodiments, schedulers 411, 412 in the independent femto cells coordinate to simultaneously serve non or low cross talk pair via proprietary algorithms and X2 link communications.

Figure 5:
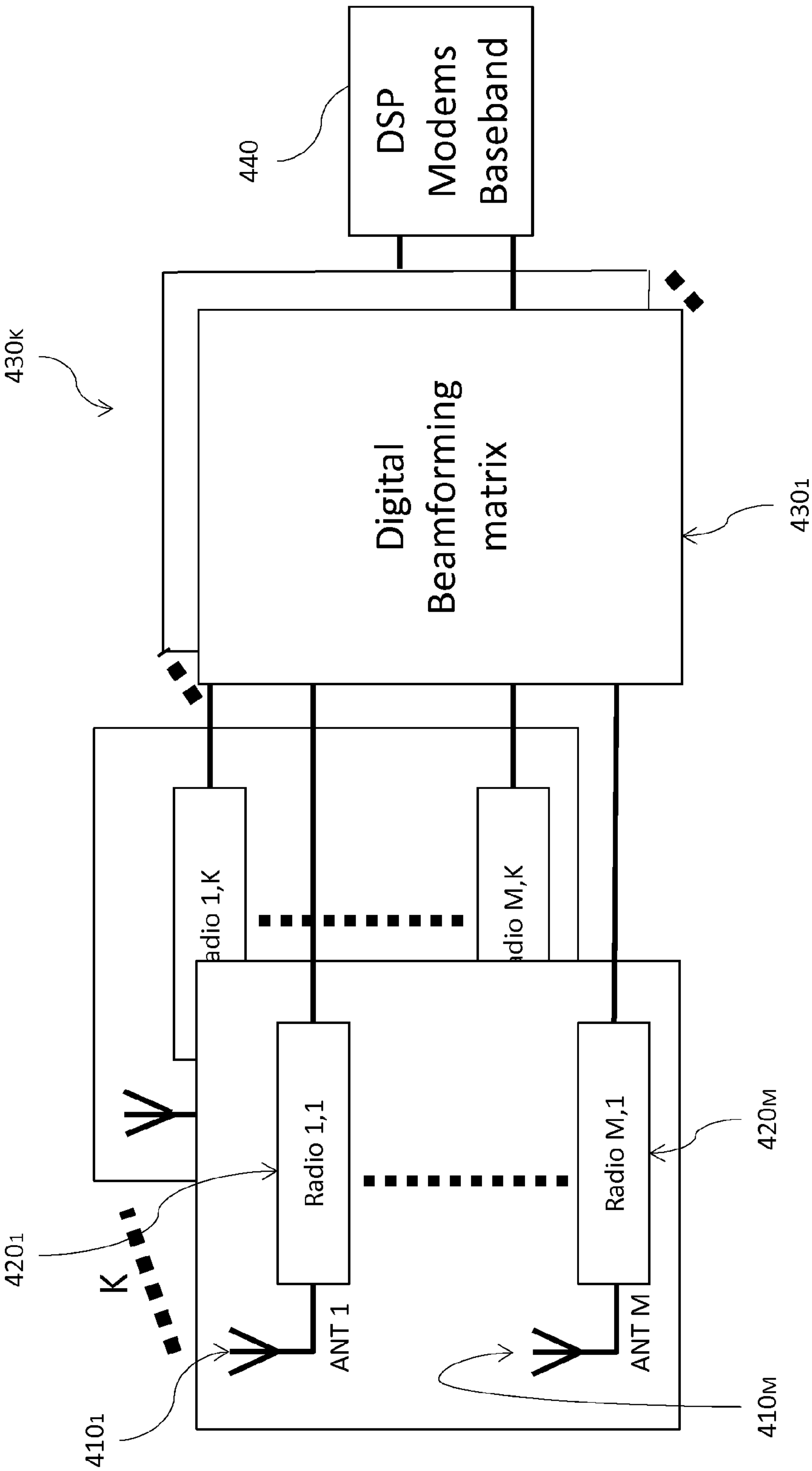
Figure 5 PRIOR ART
FIG. 5 shows a prior art example implementation, using M*K transceivers, digital beamforming, and M DSP Modems residing in baseband according to some embodiments of the present invention.

FIG. 5 shows a prior art example implementation, using M*K transceivers, digital beamforming, and M DSP Modems residing in baseband. Specifically, it shows how beamformer 200 may be can be implemented digitally. Antennas $\mathbf{410}_1$ through $\mathbf{410}_M$ feed M receivers $\mathbf{420}_1$ through $\mathbf{420}_M$. The signal output together with the measured data is routed to K digital beamformers $\mathbf{430}_1$ through $\mathbf{430}_K$, where K is the maximum number of users (e.g., operating UEs) to be simultaneously supported in the cell sector. When discussed herein, a "user" may be a UE operated by a user.

Figure 6:
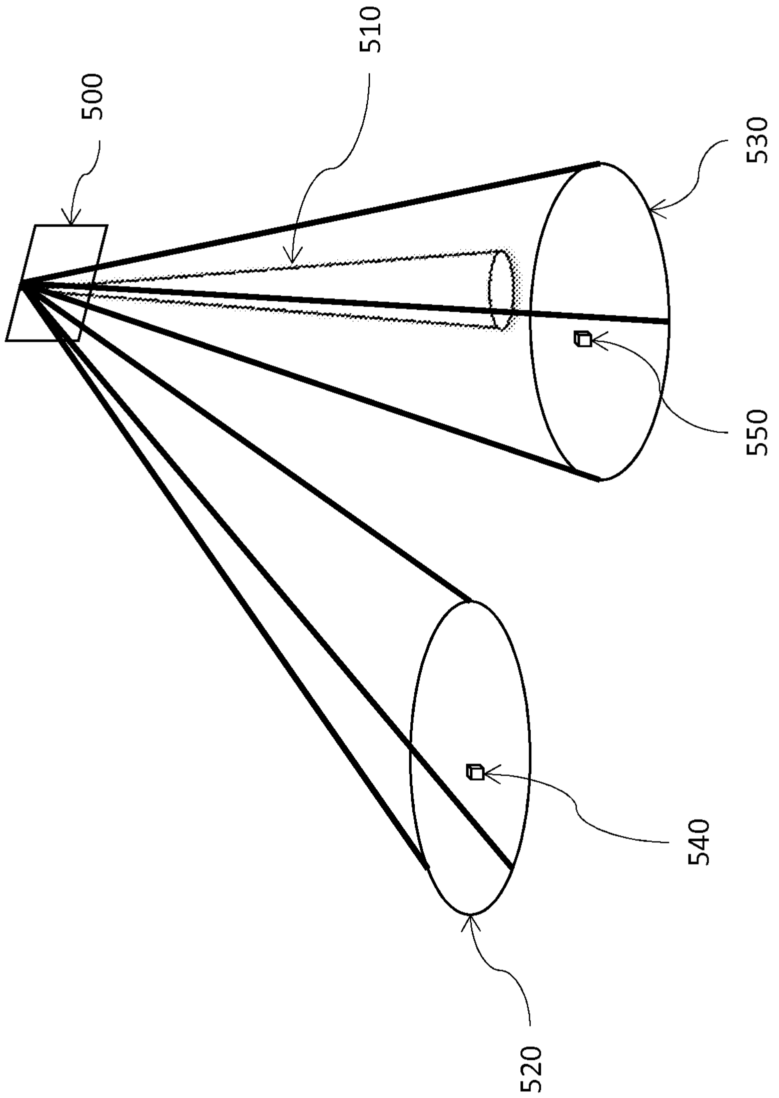
FIG. 6 shows an example of a cell with a sector split into two subsectors and supporting two simultaneous users according to some embodiments of the present invention.

FIG. 6 shows an example of a cell with a sector split into two subsectors and supporting two simultaneous users. FIG. 6 shows base station 510 and supporting two users 540 and 550 in subsector beams 520 and 530. In operation, each of the M receivers provides a channel estimation capability measuring as a minimum the received signal amplitudes and phases for all users. Each digital beamformer combines the outputs from the M radios in a manner to maximize communication performance (e.g., throughput) with its assigned user while reducing cross-talk interference to the other users. The process initially may use a standard approach (e.g., aligning all signals in phase and applying combination weightings such as MRC or optimal combining). This may mean "tilting" or "shaping" its beam and sacrificing performance to its assigned user for the benefit of another user.

According to some embodiments, the system is further configured to: estimate cross-talk level amongst the co-channel beams, and calculate weights for applying to said beamforming matrix, that reduce said cross-talk. According to some embodiments, the system analyzes the cross-talk information derived from said estimation, and identifies victim UEs being UEs affected by victimizer beams being co-frequency neighboring beams beyond a specified signal to interference ratio (SIR) threshold.

According to some embodiments, for each one of the victim UEs, and for each one of the victimizing beams, the system calculates possible weights or other parameters which result in a reduction of the cross-talk, e.g. via weight setting of the antennas of the victimizing beams. According to other embodiments, for each one of the victim UEs, and for each one of the victimizing beams, the system calculates a possible reduction of the cross-talk via weight setting of antennas of the victim UE.

According to some embodiments, the estimated cross-talks carried out or effected over partial uplink channels are extrapolated for using in the downlink channels.

Figure 7:
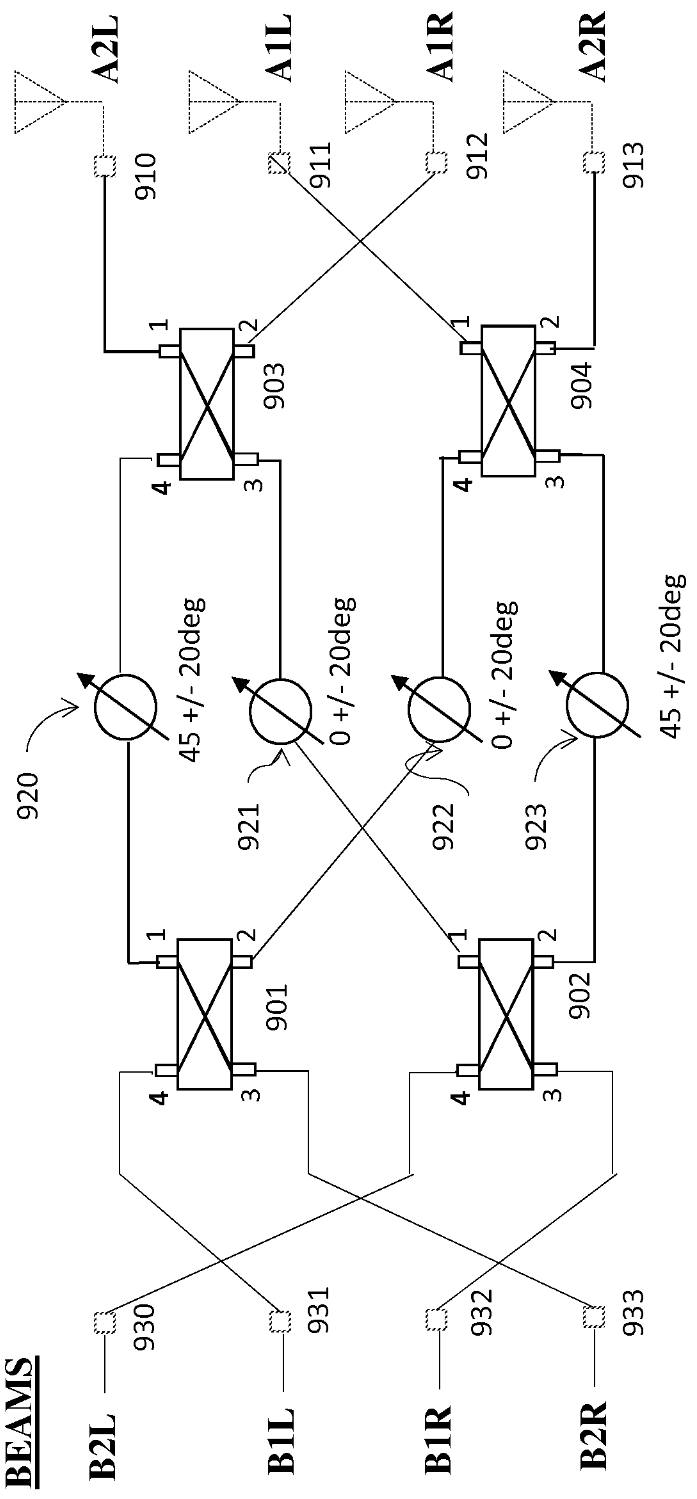
FIG. 7 is a block diagram showing an exemplary 4×4 tunable Butler Matrix according to some embodiments of the present invention.

FIG. 7 is a block diagram showing an exemplary 4×4 tunable Butler Matrix which includes Antennas Ports 910-913, Quadrature Hybrid Couplers 901-904, 45±20 deg Variable Phase Shifters 920, 923, 0±20 deg Variable Phase Shifters (example) 921, 922, The tunable Butler Matrix is configured for serving two simultaneous beams in left and right zones.

Figure 8:
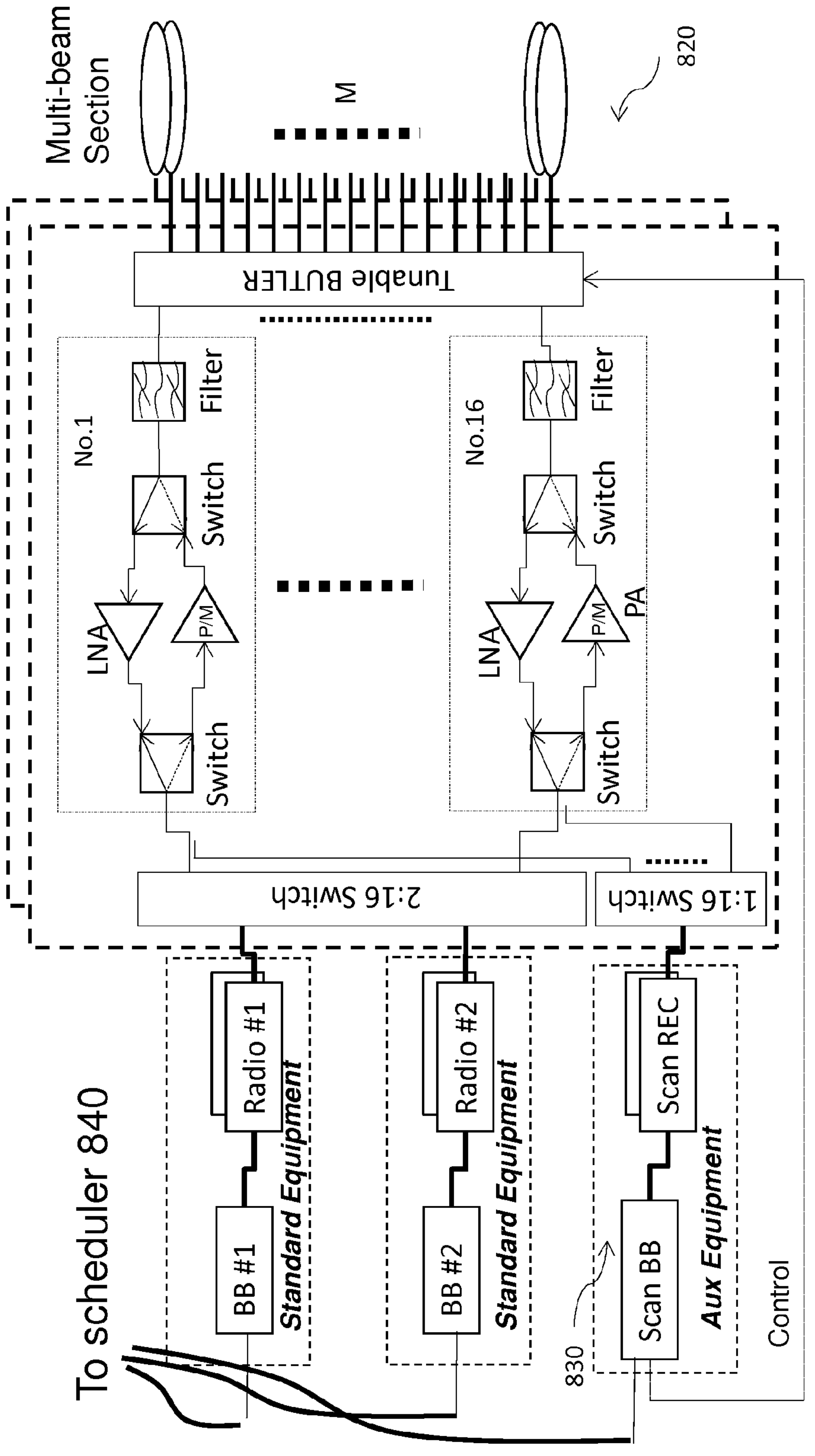
FIG. 8 shows an example of a base station embodiment implementing a combination of an omni (or a wide sector) antenna and a multi-beam set of radios which is served by a scanning receiver which assists in all matrix antennas channel estimation according to some embodiments of the present invention.

FIG. 8 shows an example of a base station embodiment implementing a combination of an omni (or a wide sector) antennas and radio (omni section 810), and a multi-beam set of antennas and radios (two radios only are shown) (multi beam section 820) which is served by a scanning receiver 830 which assists in all matrix antennas channel estimation. According to some embodiments, the omni beam operates over a frequency (e.g., uses a frequency) that is different from the frequency used by the directional co-frequency multi-beams.

According to some embodiments, the system may further include a dedicated scanning (e.g., custom made, such as an application specific integrated circuit—ASIC) receiver connected to the directional co-frequency beams, for estimating the signals of UE devices in other directional co-frequency beams, to determine and estimate cross-talk levels. It should be noted however that the scanning receiver may be omitted if Femto receivers are assigned to channel estimate all users (and not only their own beam's users).

According to some embodiments, the sector beam is assigned to cover areas not covered by said beams at a given time. According to some embodiments, the sector beam is assigned to cover UEs (e.g., special UEs) that are in the areas covered by said directional co-frequency beams at a given time. According to some embodiments, the directional co-frequency beams cover all or part of the said sector area on a time-share basis, by switching from one coverage part to another, where each unit of time share matches a time frame or subframe depending on a protocol implemented by the cellular communication base station.

In some embodiments, a scheduler 840 is arranged to schedule all base station of omni section 810 and multi beam section 820.

Following is an exemplary embodiment for implementing the Procedure and algorithm in accordance with the present invention. Other assumptions, definitions, and operations may be used:

Assumptions: flat channel, all UEs are assigned equal number of RBs.

DEFINITIONS

K: MIMO rank=number of antennas of each UE

L: total number of BTS antennas=M*K

N: (total number of radios)/K

T: total number of UEs

R: number of UEs that share the same RBs, $1 \le R \le N$ $H_i$: K×L channel matrix from the BTS antennas to $UE_i$, i=1 . . . T $\Phi=\{\phi_i, \phi_2, \ldots \phi_F\}$: set of F adjustable phases $B=B(\Phi)$: L×L transfer matrix from baseband to the BTS antennas B can be partitioned into M weight matrices of size L×K:

$$B=[W_1 \ldots W_M]$$

Only one weight matrix is used for transmitting data to a particular UE. The overall K×K channel from BTS to $UE_i$ including weights $W_j$ is: $D_{i,j}=H_i W_j$ When the BTS transmits data simultaneously to several UEs, sharing the same resources, the K×K cross-talk channel from BTS to $UE_i$ is defined as:

$$C_{i,s} = \sum_{W_k \in S} H_i W_k,$$

where S is the set of weight matrices used to transmit data to the interfering UEs ($W_i \notin S$)

For any K×K matrix A with elements $a_{ij}$ define a power operator P(A) as:

$$P(A) = \sum_{i=1}^{K} \sum_{j=1}^{K} \text{abs}(a_{ij})^2$$

Channel strengths associated with $D_{i,j}$ and $C_{i,j}$ (data and cross-talk) are defined as:

$$PD_{i,j}=P(D_{i,j})$$

$$PC_{i,S}=P(C_{i,S})$$

The signal to interference ratio for $UE_i$ is defined as:

$$SIR_{i,j,S} = \frac{PD_{i,j}}{PC_{i,S}}$$

Expressing $UE_i$'s data rate, delivered over its selected beam, in the presence of cross-talk coming from other beam's transmissions to other UEs:

$$\text{DataRate}_{i,j,S}=\text{data rate corresponding to } SIR_{i,j,S} \quad (1)$$

Define all sets of R non-overlapping beams, R=N, N/2, N/4 . . . 1, based on topology. During operation the BTS will connect radios to the first set of beams and transmit data, then switch radios over to the next set for the next transmission, etc., until all UEs are served (note that when a given beam has no UE assigned to it, transmission of will not take place).

Optimization process may be depicted as follows:

Start with R=N.

Step 1: For all UEs compute $PD_{i,j}$, i=1 . . . T,j=1 . . . □, i.e., for all UEs compute the channel strength through all possible beams.

Step 2: Grade $PD_{i,j}$ and select the strongest and 2nd strongest beams for each UE.

Step 3: Compare strongest and 2nd strongest powers, and tag cases where the power difference is smaller than x (e.g. 6 dB); such UEs are categorized as candidates for 2nd best beam allocation; compare combined bandwidth requirements per beam and tag differences larger than 1:y (e.g. 1:2); calculate moving of candidate UEs to 2nd best beams, and pick such candidates moving that improve load balancing.

Step 4: Starting with the first set of non-overlapping beams, compute the total data rate as the sum of the data rates of all UEs in the beam set, where each UE's data rate is expressed in formula (I) above.

Step 5: Scanning the Φ domain for all beams, repeat Step 4, compare results and pick the highest total data rate weights as candidates setting.

Step 6: Repeat Steps 4 and 5 for all sets of non-overlapping beams, choosing candidate settings.

Step 7: Repeat Steps 4, 5 and 6 for R=N/2, N/4 . . . 1, choosing candidate settings for each.

Step 8: Calculate global data rates for N, N/2, N/4 . . . 1, and pick highest as chosen Weights settings.

Figure 9:
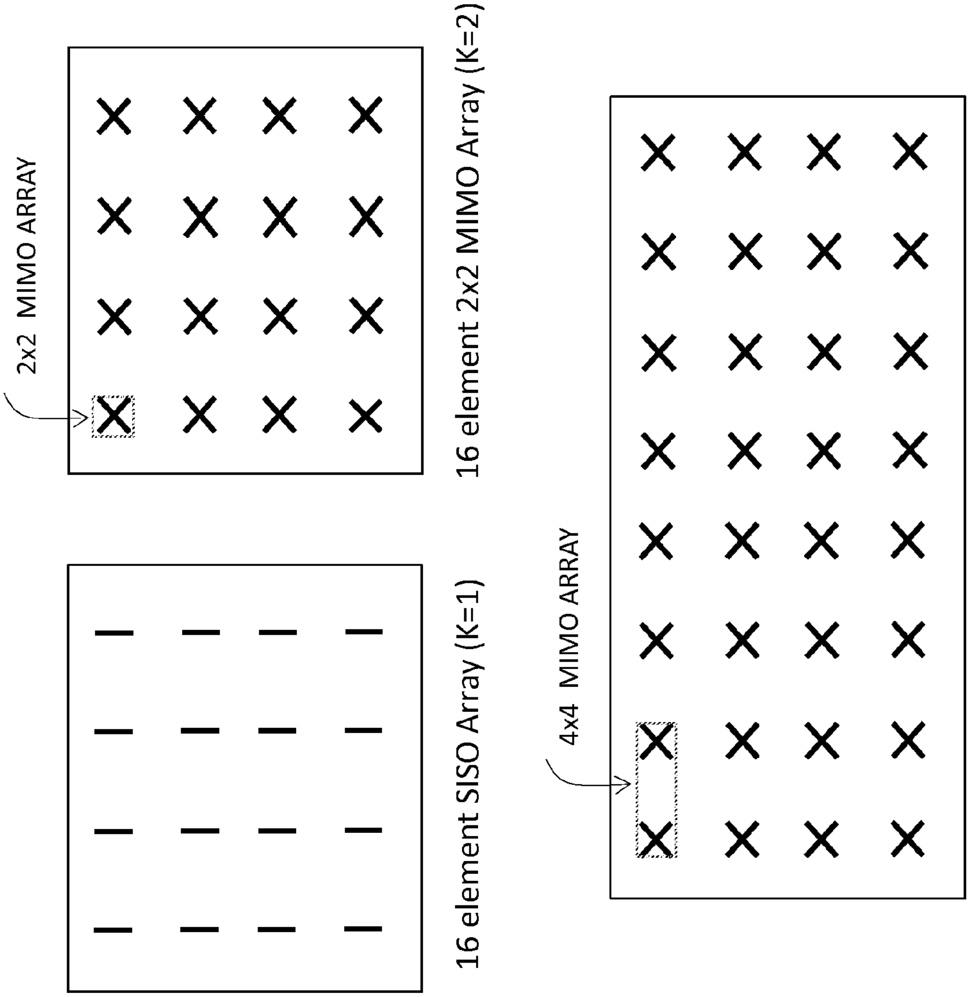
FIG. 9 shows examples of antenna arrays according to some embodiments of the present invention.

FIG. 9 shows examples of antenna arrays according to some embodiments. The antennas may include a 2D antenna array, where each element may be either single or dual polarization, (so that dual polarization may support 2×2 MIMO). Said antenna array may be fed by an RF beamformer, for example, a 2D Butler matrix, that may be fixed or variable.

According to some embodiments, the system further includes a N×M switch matrix which is connected to the M×N ports, enabling feeding said directional co-frequency beams with one or more base-stations, and the single port with an additional base station.

According to some embodiments, the single port base station which feeds the sector beam is using high power amplifier while the base stations connected to either one of the M×N ports is using a low power amplifier, wherein the ratio between the gain of the high and the low power amplifier is inversely proportional to the ratio between the gain of a directional beam created by the said array and the gain of the sector beam.

According to some embodiments, the base stations connected to the M×N ports are configured to use the same frequency channel on non-adjacent beams.

Figure 10:
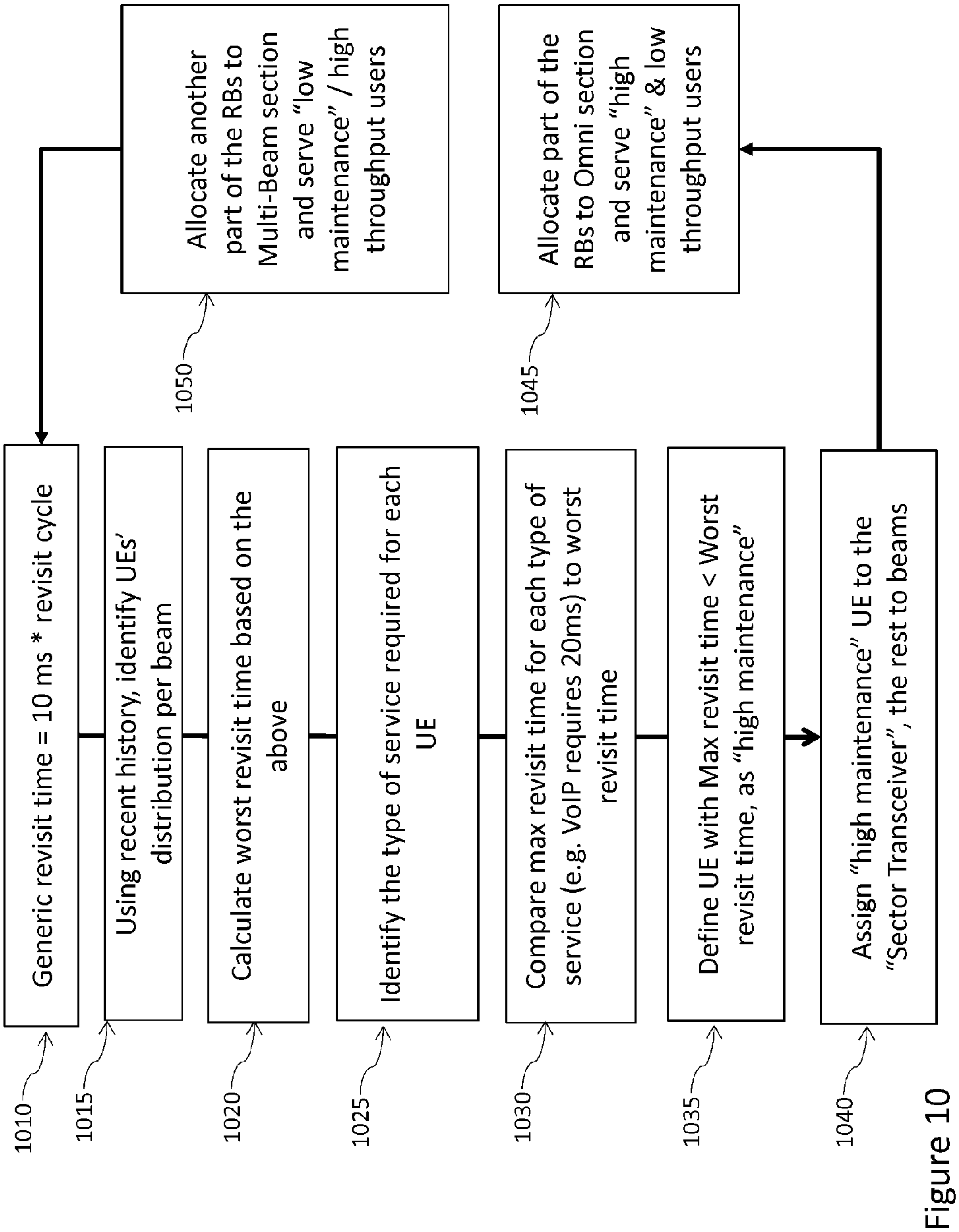
FIG. 10 shows a method of separation of UEs into categories according to some embodiments of the present invention.

The process of the embodiment of FIG. 10 is based on a beam cycling mechanism, where for example a 2D 4×4 beam array is sub-divided into 4 groups, each consisted of non-adjacent 4 beams, where the said groups are taking turns in connecting to a one set of 4 base stations; the said sequence is described in this example creates a service duty cycle of ¼ for each one of the said groups. FIG. 10 shows an embodiment of a method of separation of UEs into categories. According to some embodiments, the system is configured to categorize UE devices that require maximum transfer delay lower than a predefined threshold. According to some embodiments, the predefined threshold is lower than the cycle period of beams rotation causing the categorized UE devices to be configured for service by the sector beam on a sustainable basis. According to some embodiments, the UE devices having maximum transfer delay requirements not lower than said predefined threshold are provided as candidates to the master scheduler to be served by the directional co-frequency beams.

The process illustrated in FIG. 10 may include for example: Defining a Generic revisit time=10 ms*revisit cycle (stage 1010), wherein the "Revisit cycle" may be defined as (Ratio between # of beams and # of radios)−1; Using recent history, identify UEs' distribution per beam (stage 1015); Calculating worst revisit time based on the above (stage 1020); Identifying the type of service required for each UE (stage 1025); Comparing max revisit time for each type of service (e.g. VoIP requires 20 ms) to worst revisit time (stage 1030); Defining UE with Max revisit time<Worst revisit time, as "high maintenance" (stage 1035); Assigning "high maintenance" UE to the "Sector Transceiver", the rest to beams (stage 1040); Allocating part of the RBs to Omni section and serve "high maintenance" and low throughput users (stage 1045); and Allocating another part of the RBs to Multi-Beam section and serve "low maintenance"/high throughput users (stage 1050). As with other embodiments shown herein, other or different operations may be used.

Figure 11:
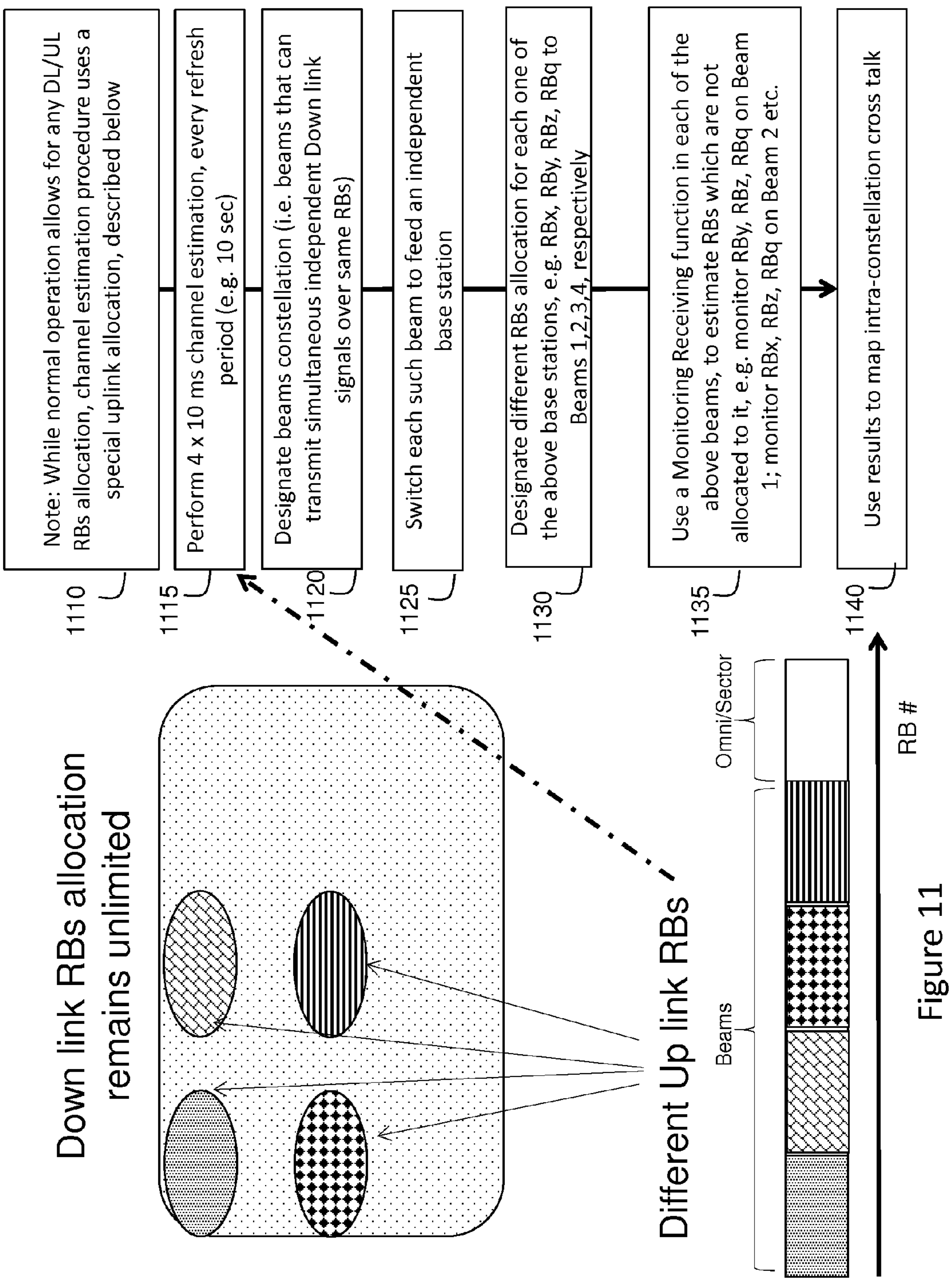
FIG. 11 shows cross-talk estimation intra beam constellation according to some embodiments of the present invention.

FIG. 11 shows cross-talk estimation intra beam constellation. According to some embodiments, the directional co-frequency beams are systematically (e.g., according to a predefined scheme) re-directed from one sector part to another, completing a full round within a given cycle, wherein a number of permutations of constellations per cycle is determined by an angle of the sector divided by a combined average angle of said directional co-frequency beams. According to some embodiments, the full cycle period of beams rotation is the number of permutation times the said time frame or subframe duration. The process illustrated in FIG. 11 comprises the following stages: While normal operation allows for any DL/UL RBs allocation, channel estimation procedure uses a special uplink allocation, described below (stage 1110); Performing 4×10 ms channel estimation, every refresh period (e.g. 10 sec) (stage 1115); Designating beams constellation (i.e. beams that can transmit simultaneous independent Down link signals over same RBs) (stage 1120); Switching each such beam to feed an independent base station (stage 1125); Designating different RBs allocation for each one of the above base stations, e.g. RBx, RBy, RBz, RBq to Beams 1, 2, 3, 4, respectively (stage 1130); Using a Monitoring Receiving function in each of the above beams, to estimate RBs which are not allocated to it, e.g. monitor RBy, RBz, RBq on Beam 1; monitor RBx, RBz, RBq on Beam 2 etc. (stage 1135); and Using results to map intra-constellation cross talk (stage 1140).

Figure 12:
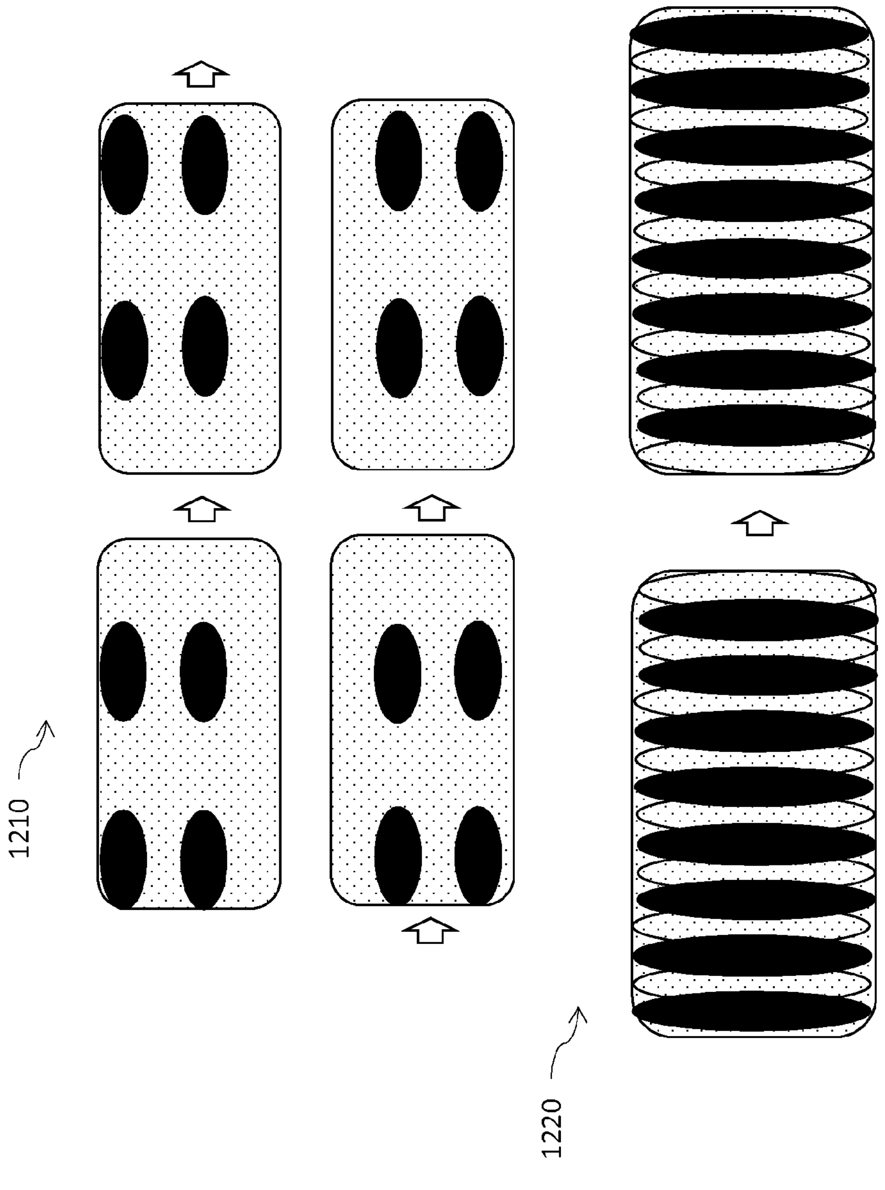
FIG. 12 shows different constellations of beams that transmit simultaneously over same resources according to some embodiments of the present invention.

FIG. 12 shows different constellations of beams that transmit simultaneously over same resources. FIG. 12 illustrates a 2D beamformer example, where 4 non-overlapping groups are time sequenced in a round-robin 1:4 cycle (top illustration 1210) and a 1D beamformer example, where 2 non-overlapping groups are time sequenced in a round-robin 1:2 cycle (bottom illustration 1220). Beam constellations may be defined as beams using same time/frequency resources (Enabling reuse of same resources).

Figure 13:
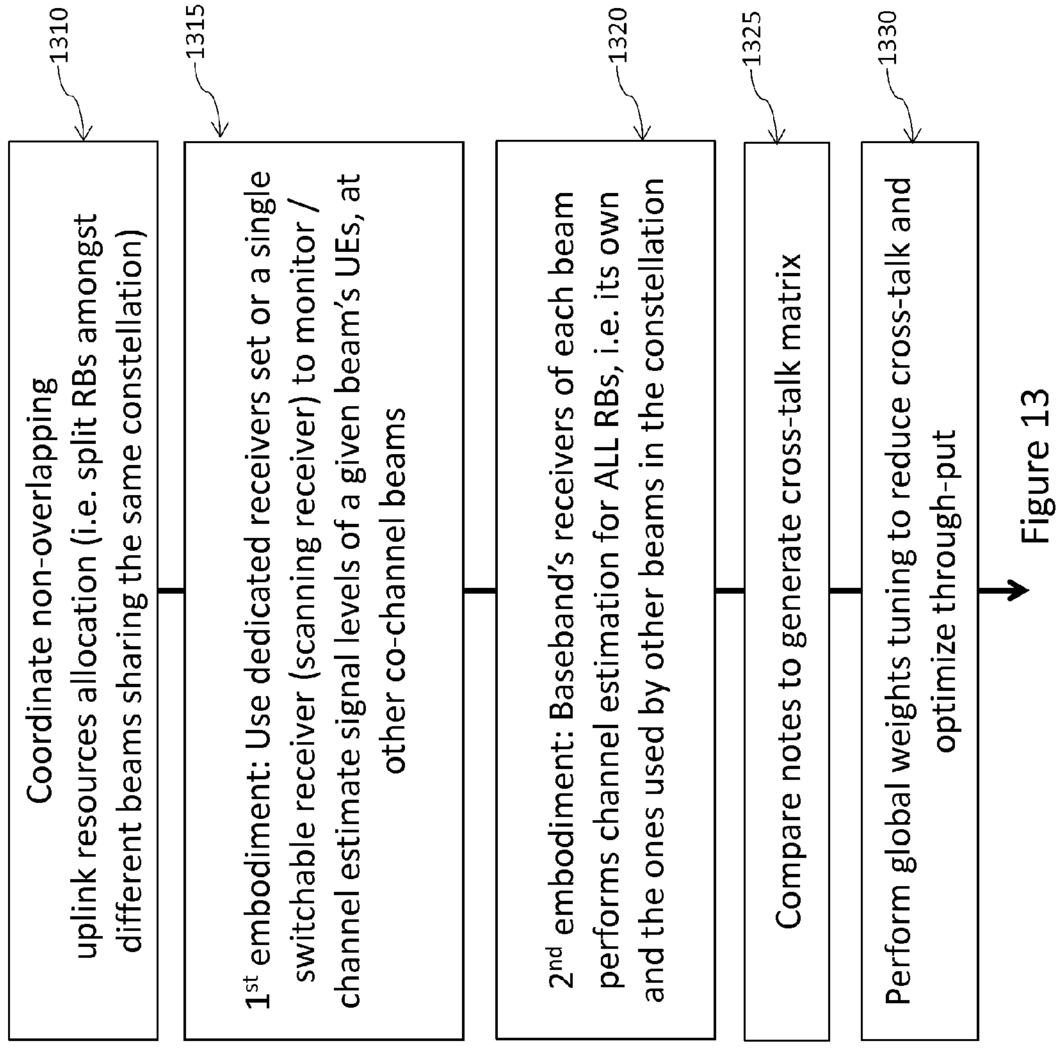
FIG. 13 shows a procedure for cross-talk estimation in beam constellations according to some embodiments of the present invention.

FIG. 13 shows an embodiment of a procedure for cross-talk estimation in beams constellations. The process illustrated in FIG. 13 comprises the following stages: Coordinating non-overlapping uplink resources allocation (i.e. split RBs amongst different beams sharing the same constellation) (stage 1310); in one embodiment: Using dedicated receivers set or a single switchable receiver (scanning receiver) to monitor/channel estimate signal levels of a given beam's UEs, at other co-channel beams (stage 1315); in a second embodiment: Baseband's receivers of each beam performs channel estimation for all RBs, e.g. its own and the ones used by other beams in the constellation (stage 1320); Comparing notes to generate cross-talk matrix (stage 1325); and Performing global weights tuning to reduce cross-talk and optimize through-put (stage 1330).

Figure 14A:
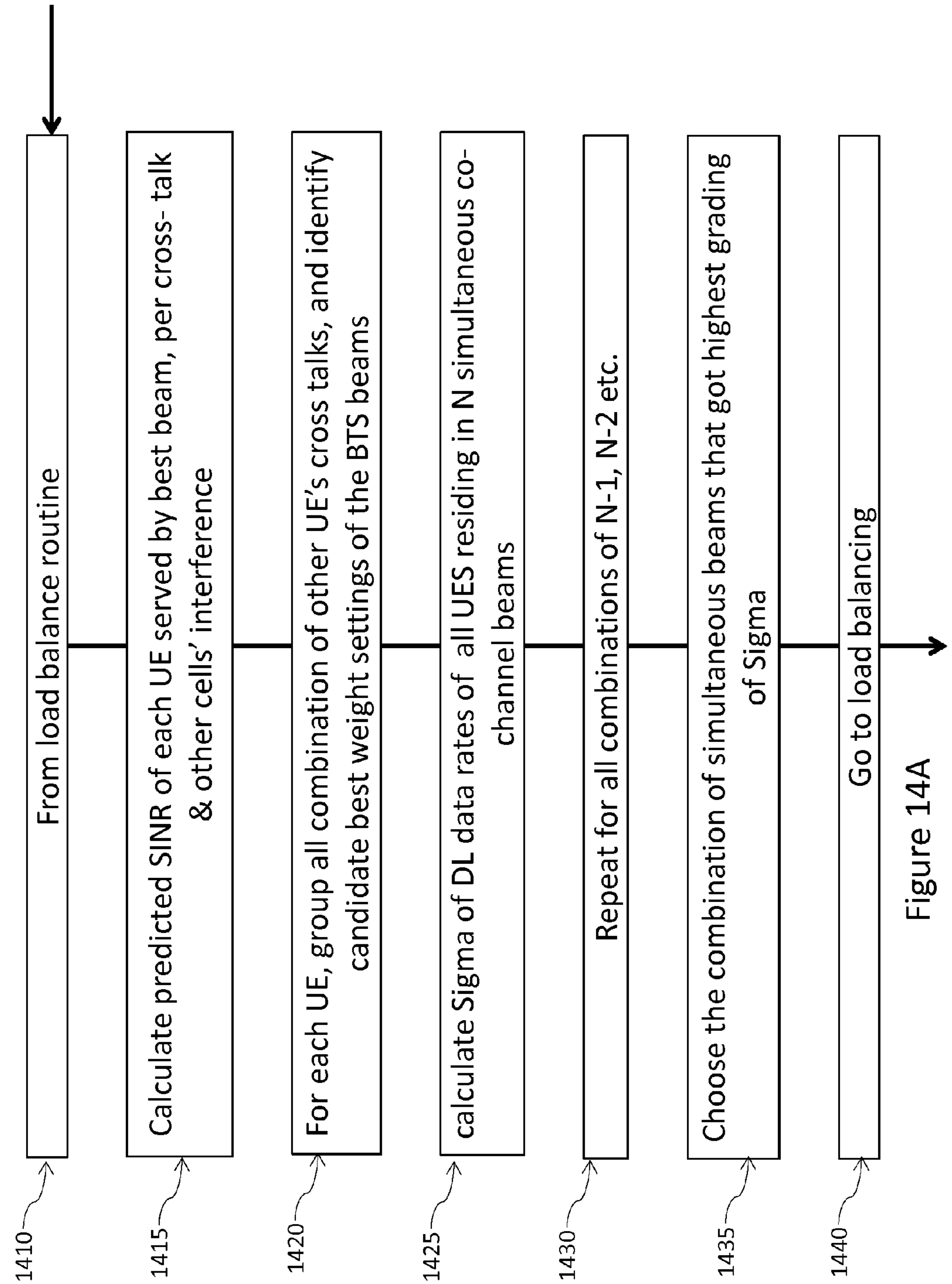
FIG. 14A shows a procedure for weights setting and simultaneous beams calculation process according to some embodiments of the present invention.

FIG. 14A shows an embodiment of a procedure for weights setting and simultaneous beams calculation process. The procedure illustrated in FIG. 14A comprises the following stages: Receiving data from the load balance routine (stage 1410); Calculating predicted SINR of each UE served by best beam, per cross-talk and other cells' interference (stage 1415); For each UE, grouping all combination of other UE's cross talks, and identify candidate best weight settings of the BTS beams (stage 1420); calculating Sigma of DL data rates of all UES residing in N simultaneous co-channel beams (stage 1425); Repeating the above for all combinations of N−1, N−2 etc. (stage 1430); Choosing the combination of simultaneous beams that got highest grading of Sigma (stage 1435); and Going to load balancing (FIG. 14B) (stage 1440). The procedure further comprises using Uplink channel estimations to estimate Downlink channels (TD Reciprocity).

Figure 14B:
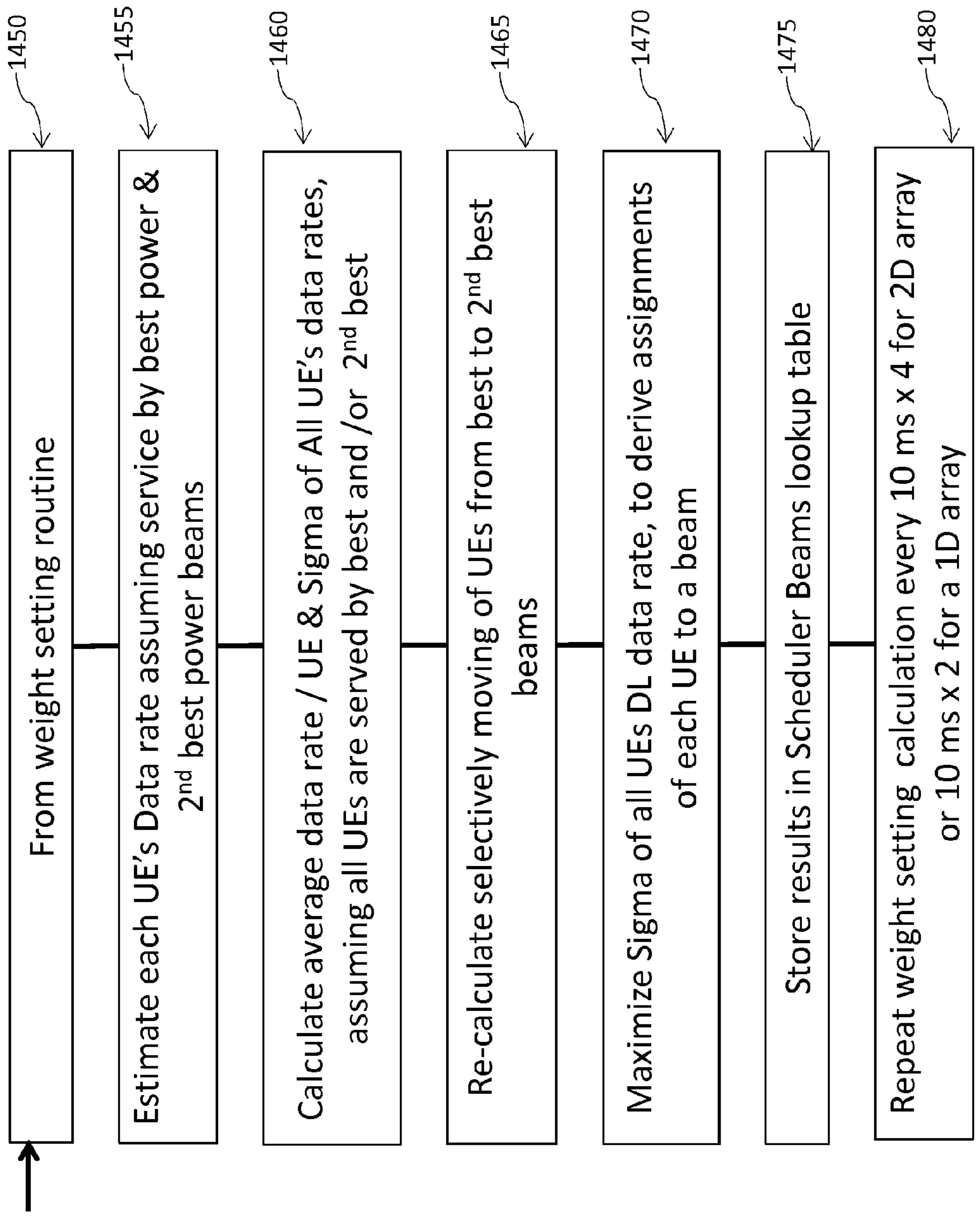
FIG. 14B shows a procedure for load balancing according to some embodiments of the present invention.

FIG. 14B shows an embodiment of a procedure for load balancing. The procedure illustrated in FIG. 14B comprises the following stages: Receiving weights from weight setting routine (FIG. 14A) (stage 1450); Estimating each UE's Data rate assuming service by best power and $2^{nd}$ best power beams (stage 1455); Calculating average data rate/UE and Sigma of All UE's data rates, assuming all UEs are served by best and/or $2^{nd}$ best (stage 1460); Re-calculating selectively moving of UEs from best to $2^{nd}$ best beams (stage 1465); Maximizing Sigma of all UEs DL data rate, to derive assignments of each UE to a beam (stage 1470); Storing results in Scheduler Beams lookup table (stage 1475); and Repeating weight setting calculation every 10 ms×4 for 2D array or 10 ms×2 for a 1D array (stage 1480). The "Best Power beam" may be defined as a beam that measures UE's uplink K×K RMS power to be higher than others.

Figure 15:
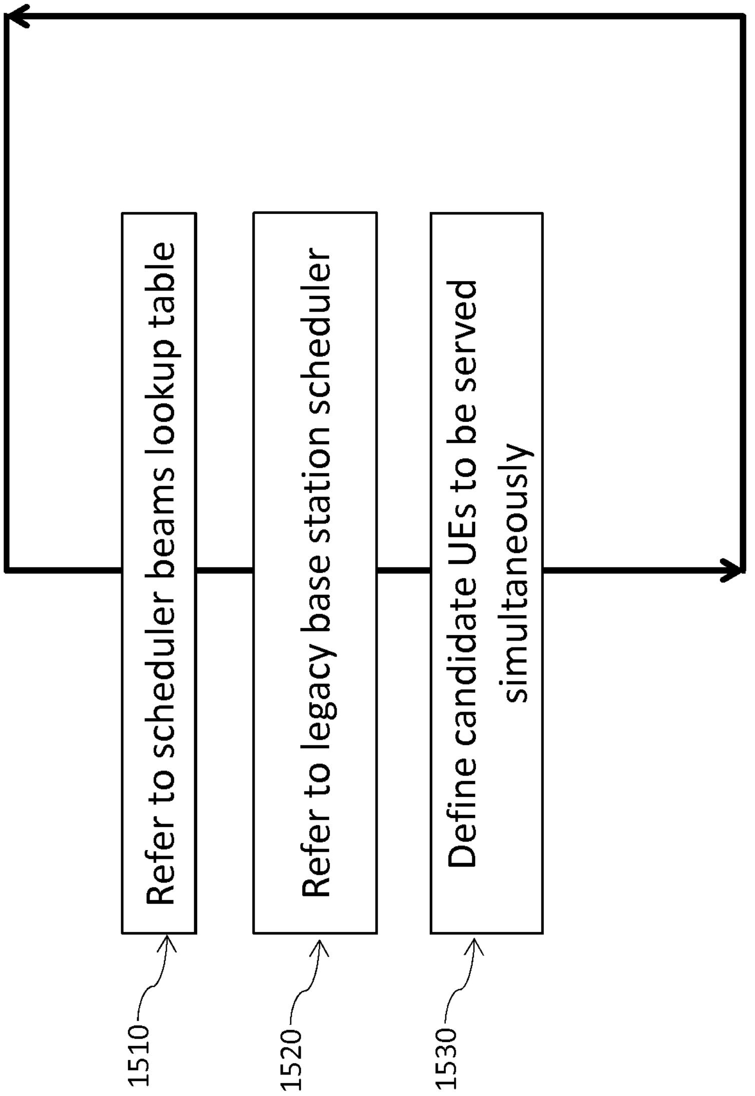
FIG. 15 shows a scheduler process according to some embodiments of the present invention.

FIG. 15 Shows a scheduler process according to some embodiments of the present invention. According to some embodiments, the system further includes a master scheduler configured to receive the identified victim UEs and the respective victimizing beams in said sector. According to some embodiments, the system further includes a coordinator configured to reduce co-schedule occurrence of victim UE devices having victimizing beams. The process illustrated in FIG. 15 may include for example stages such as: referring to scheduler beams lookup table (stage 1510); referring to legacy base station scheduler (stage 1520); and defining or determining candidate UEs to be served simultaneously (stage 1530). The process may repeat or iterate, moving from operation 1530 to operation 1510.

According to some embodiments, all non-adjacent beams are being fed by a cluster of co-channel base stations, and wherein the base stations of the cluster are systematically switched between said group of ports so that all the sector's angle is methodically covered via sequential or other cycle, and by doing so serve all assigned UE devices residing in the sector with the directional beams on a time-share basis.

According to some embodiments, the RF beamformer includes variable phase shifters with limited range so that the directional beams can be tilted up or down and left or right.

According to some embodiments, the tilting of both victim and victimizer is used for reducing measured cross-talk via channel estimation and/or blind process.

According to some embodiments, a protocol used by the base station is orthogonal frequency-division multiplexing (OFDM), and wherein at least some of the OFDM subcarriers are allocated to the sector beams and the rest of the OFDM subcarriers are allocated to the directional beams, so that the ratio between the number of subcarriers allocated to the sector beams and the number of subcarriers allocated to the directional beams reflects respective bandwidth requirements of assigned UE devices, based on a specified fairness scheme.

According to some embodiments, the base stations used are operating in a Time Domain duplex TDD mode, in which channel estimation of an uplink channel is used to set weights of a downlink channel.

According to some embodiments, the cross-talk reduction is carried out using periodic (e.g., that is carried repeatedly at a specified duty cycle) look-through configurations, wherein the uplink spectrum allocated to the directional beams is split or divided up to NB subgroups where NB is the number of simultaneous directional co-frequency beams, so that during the look-through, each beam assigns its served UE devices with its allocated 1/NB of the uplink spectrum, so that during the look-through, uplink transmissions of directional co-frequency beams are orthogonal.

In various embodiments, computational modules may be implemented by e.g., processors (e.g., a general purpose computer processor or central processing unit executing software), or DSPs, or other circuitry. The baseband modem may be implemented, for example, as a DSP. A beamforming matrix can be calculated and implemented for example by software running on general purpose processor. Beamformers, a gain controller, switches, combiners, phase shifters may be for example RF circuitries.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system."

In various embodiments, computational modules may be implemented by e.g., processors (e.g., a general purpose computer processor or central processing unit executing software), or digital signal processors (DSPs), or other circuitry. The baseband modem may be implemented, for example, as a DSP. A beamforming matrix can be calculated and implemented for example by software running on general purpose processor. Beamformers, gain controllers, switches, combiners, and phase shifters may be implemented, for example using RF circuitries.

The flowchart and block diagrams herein illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:

a plurality of transmit and receive antennas covering one sector of a cellular communication base station;

a multi-beam RF beamforming matrix connected to said transmit and receive antennas;

a plurality of radio circuitries connected to said multi-beam RF beamforming matrix; and a baseband module connected to said radio circuitries, wherein the multi-beam RF beamforming matrix is configured to generate one sector beam and two or more directional co-frequency beams, wherein the sector beam operates over a frequency that is different from the frequency used by said directional co-frequency beams, wherein the baseband module assigns each user equipment (UE) to the sector beam or to at least one of said directional co-frequency beams based on a service type, and wherein a number M denotes the number said directional beams and a number N denotes the number of said radio circuitries and wherein M>N.

2. The system according to claim 1, wherein each of said directional co-frequency beams serves a different channel.

3. The system according to claim 1, wherein the system is configured to:

(a) estimate cross-talk level amongst the co-frequency beams, and (b) calculate weights for applying to said beamforming matrix, that reduce said cross-talk.

4. The system according to claim 3, wherein the system analyzes the cross-talk information derived from said estimation, and identifies victim UEs, the victim UEs being UEs affected by victimizer beams being co-frequency neighboring beams creating a signal to interference ratio (SIR) above a predetermined threshold.

5. The system according to claim 4, wherein for each one of the victim UEs, and for each one of the victimizing beams, the system calculates weights which result in a possible reduction of the cross-talk via weight setting of the antennas of the victimizing beams.

6. The system according to claim 4, wherein for each one of the victim UEs, and for each one of the victimizing beams, the system calculates weights which result in a possible reduction of the cross-talk via weight setting of antennas of the victim UE.

7. The system according to claim 4, further comprising a scheduler configured to receive the identified victim UEs and the respective victimizing beams in said sector.

8. The system according to claim 4, further comprising a coordinator configured to reduce co-schedule occurrence of victim UEs having victimizing beams.

9. The system according to claim 1, wherein said sector beam is assigned to cover areas not covered by said beams at a given time.

10. The system according to claim 1, wherein said sector beam is assigned to cover UEs that are in the areas covered by a plurality of said directional co-frequency beams at a given time.

11. The system according to claim 1, wherein the said directional co-frequency beams cover all or part of the said sector area on a time-share basis, by switching from one coverage part to another, where each unit of time share matches a time frame or subframe depending on a protocol implemented by the cellular communication base station.

12. The system according to claim 1, where the directional co-frequency beams are systematically re-directed from one sector part to another, completing a full round within a given cycle, wherein a number of permutations per cycle is determined by an angle of the sector divided by a combined average angle of said directional co-frequency beams.

13. The system according to claim 12, wherein the full cycle period of beams rotation is the number of permutation times the said time frame or subframe duration.

14. The system according to claim 1, wherein the system is configured to categorize UE devices that require maximum transfer delay lower than a predefined threshold.

15. The system according to claim 14, wherein the predefined threshold is lower than the cycle period of beams rotation, causing the categorized UE devices to be configured for service by the sector beam on a sustainable basis.

16. The system according to claim 15, wherein the UE devices having maximum transfer delay requirements not lower than said predefined threshold, are provided as candidates to the master scheduler to be served by the directional co-frequency beams.

17. The system according to claim 1, wherein the antennas comprise a 2D antenna array of N rows and M columns which is fed by fixed beamformer RF matrix arrays for each row, and by fixed beamformer RF matrix arrays for each column, so that the total number of such beamformers equals the number of rows+the number of columns N+M, providing N×M input and or output ports, and additionally a single antenna with a similar coverage angle in both azimuth and elevation axis which provides a single input and or output, so that the M×N ports defined as M×N narrow beams and the said single port are redefined as sector beam.

18. The system according to claim 17, further comprising a N×M switch matrix connected to said M×N ports, enabling feeding said directional co-frequency beams with one or more base-stations, and the single port with an additional base station.

19. The system according to claim 18, wherein the said single port base station which feeds the sector beam uses a high power amplifier while the base stations connected to either one of the M×N ports uses a low power amplifier, wherein the ratio between the gain of the high and the low power amplifier is inversely proportional to the ratio between the gain of a directional beam created by the said array, and the gain of the sector beam.

20. The system according to claim 19, wherein the base stations connected to the M×N ports are configured to use the same frequency channel on non-adjacent beams.

21. The system according to claim 20, wherein, all non-adjacent beams are fed by a cluster of co-channel base stations, and wherein the base stations of said cluster are systematically switched between said group of ports so that all the sector's angle is covered via sequential or other cycle, and by doing so serve all assigned UE devices residing in the sector with the directional beams on a time-share basis.

22. The system according to claim 17, wherein the RF beamformer comprises phase shifters with limited range so that the directional beams can be tilted up or down and left or right.

23. The system according to claim 22, wherein the tilting of both victim UE and victimizer beam, is used for reducing measured cross-talk via channel estimation and/or blind process.

24. The system according to claim 1, wherein a protocol used by the base station is orthogonal frequency-division multiplexing (OFDM), and wherein at least some of the OFDM subcarriers are allocated to the sector beams and the rest of the OFDM subcarriers are allocated to the directional beams, in a ratio that reflects respective bandwidth requirements of assigned UE devices, based on a specified fairness scheme.

25. The system according to claim 23, where the base stations used are operating in a Time Domain duplex TDD mode, in which channel estimation of an uplink channel is used to set weights of a downlink channel.

26. A system according to claim 23, wherein the cross-talk reduction is carried out using periodic look-through configurations, wherein the uplink spectrum allocated to the directional beams is divided up to K subgroups where K is the number of simultaneous directional co-frequency beams, so that during said look-through, each beam assigns its served UE devices with its allocated 1/K of the uplink spectrum, so that during the look-through, uplink transmissions of directional co-frequency beams are orthogonal.

27. The system according to claim 26, further comprising a dedicated scanning receiver connected to the directional co-frequency beams, for estimating the signals of UE devices in other directional co-frequency beams, to determine and estimate cross-talk levels.

28. The system according to claim 27, wherein the baseband modules of the base station are configured to measure all UE devices in all directional co-frequency beams operative in the base station, so that said baseband modules estimate the said cross-talk.

29. The system according to claim 27, wherein the estimated cross-talks carried out over partial uplink channels are extrapolated for using the downlink channels.

30. The system according to claim 1, wherein the sector beam is substantially omnidirectional.

* * * * *